(12) United States Patent
Maruyama et al.

(10) Patent No.: US 6,915,427 B2
(45) Date of Patent: Jul. 5, 2005

(54) HUB APPARATUS WITH COPYRIGHT PROTECTION FUNCTION

(75) Inventors: Junichi Maruyama, Yokohama (JP);
Takashi Tsunehiro, Ebina (JP);
Kunihiro Katayama, Chigasaki (JP);
Takashi Totsuka, Machida (JP);
Motoyasu Tsunoda, Sagamihara (JP);
Shinya Iguchi, Fujisawa (JP);
Nagamasa Mizushima, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 788 days.

(21) Appl. No.: 09/800,731

(22) Filed: Mar. 8, 2001

(65) Prior Publication Data

US 2002/0015497 A1 Feb. 7, 2002

(30) Foreign Application Priority Data

Aug. 2, 2000 (JP) ....................................... 2000-238864

(51) Int. Cl.[7] .............................. H04L 9/00; H04L 9/32
(52) U.S. Cl. ........................ 713/168; 713/189; 713/193
(58) Field of Search ................................ 380/277–278, 380/201, 200, 283; 713/168–170, 189, 192–193, 176, 200; 705/51, 43, 59, 57

(56) References Cited

U.S. PATENT DOCUMENTS

| | | | | | |
|---|---|---|---|---|---|
| 6,009,170 | A | * | 12/1999 | Sako et al. | 380/201 |
| 6,104,813 | A | * | 8/2000 | McRae | 380/201 |
| 6,424,715 | B1 | * | 7/2002 | Saito | 380/201 |
| 6,584,552 | B1 | * | 6/2003 | Kuno et al. | 711/163 |
| 6,615,192 | B1 | * | 9/2003 | Tagawa et al. | 705/57 |
| 6,678,236 | B1 | * | 1/2004 | Ueki | 369/275.3 |
| 6,681,015 | B1 | * | 1/2004 | Hioki et al. | 380/231 |

FOREIGN PATENT DOCUMENTS

| | | |
|---|---|---|
| JP | 11203249 | 7/1999 |
| JP | 2000138664 | 5/2000 |

* cited by examiner

*Primary Examiner*—Hosuk Song
(74) *Attorney, Agent, or Firm*—Mattingly, Stanger, Malur & Brundidge, P.C.

(57) ABSTRACT

A license hub including a hub apparatus to which one or more apparatus and devices can be electrically connected, and a safe storage device for storing therein keys used to decode the encrypted contents data is added to the existing system to construct a license network. A controller of the license network acquires the information of various kinds of apparatuses and devices which are electrically connected to the license hub, and determines automatically the apparatus and/or the device suitable for executing the processing when carrying out the playback of contents or movement of the key to execute these processings.

7 Claims, 17 Drawing Sheets

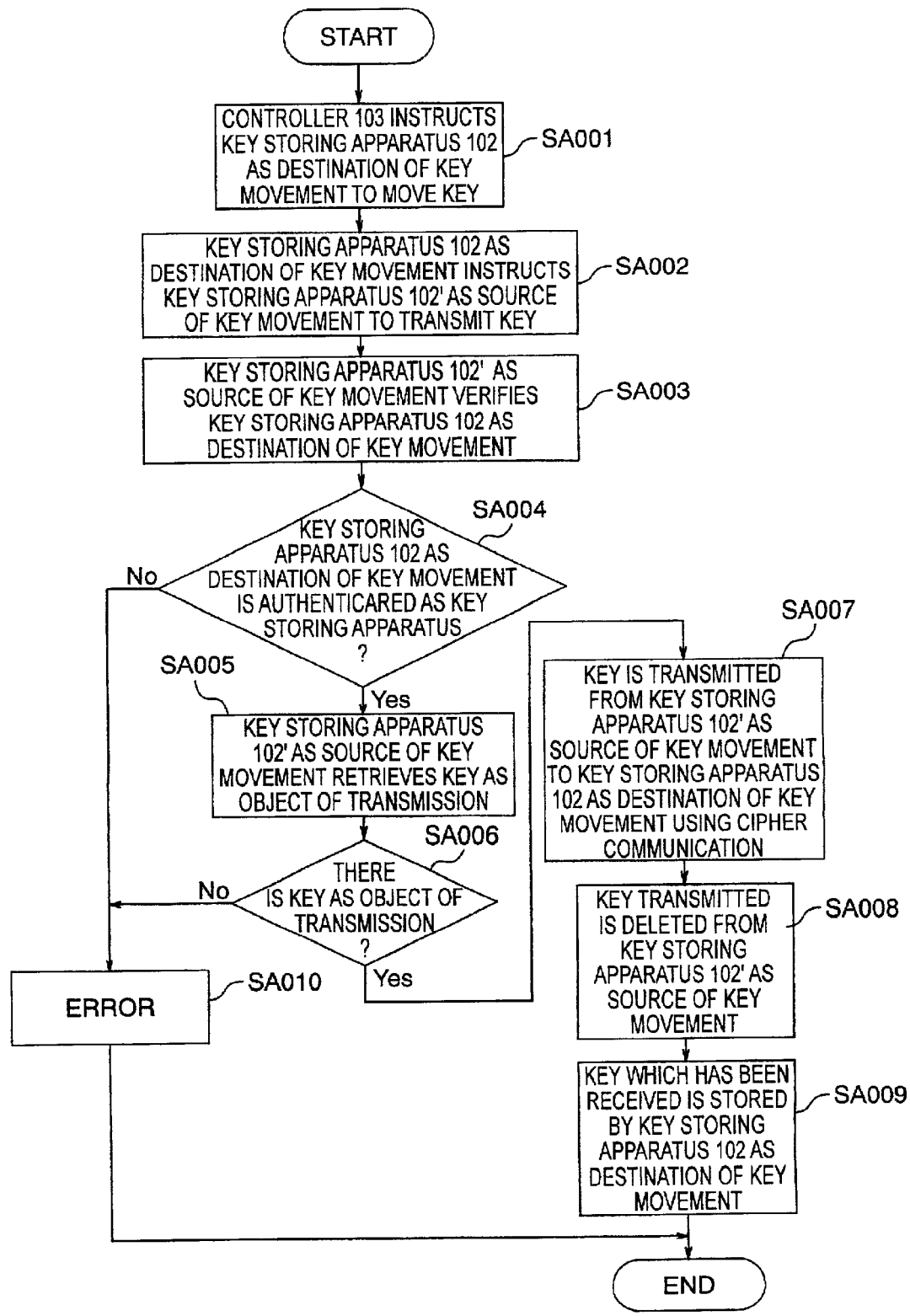

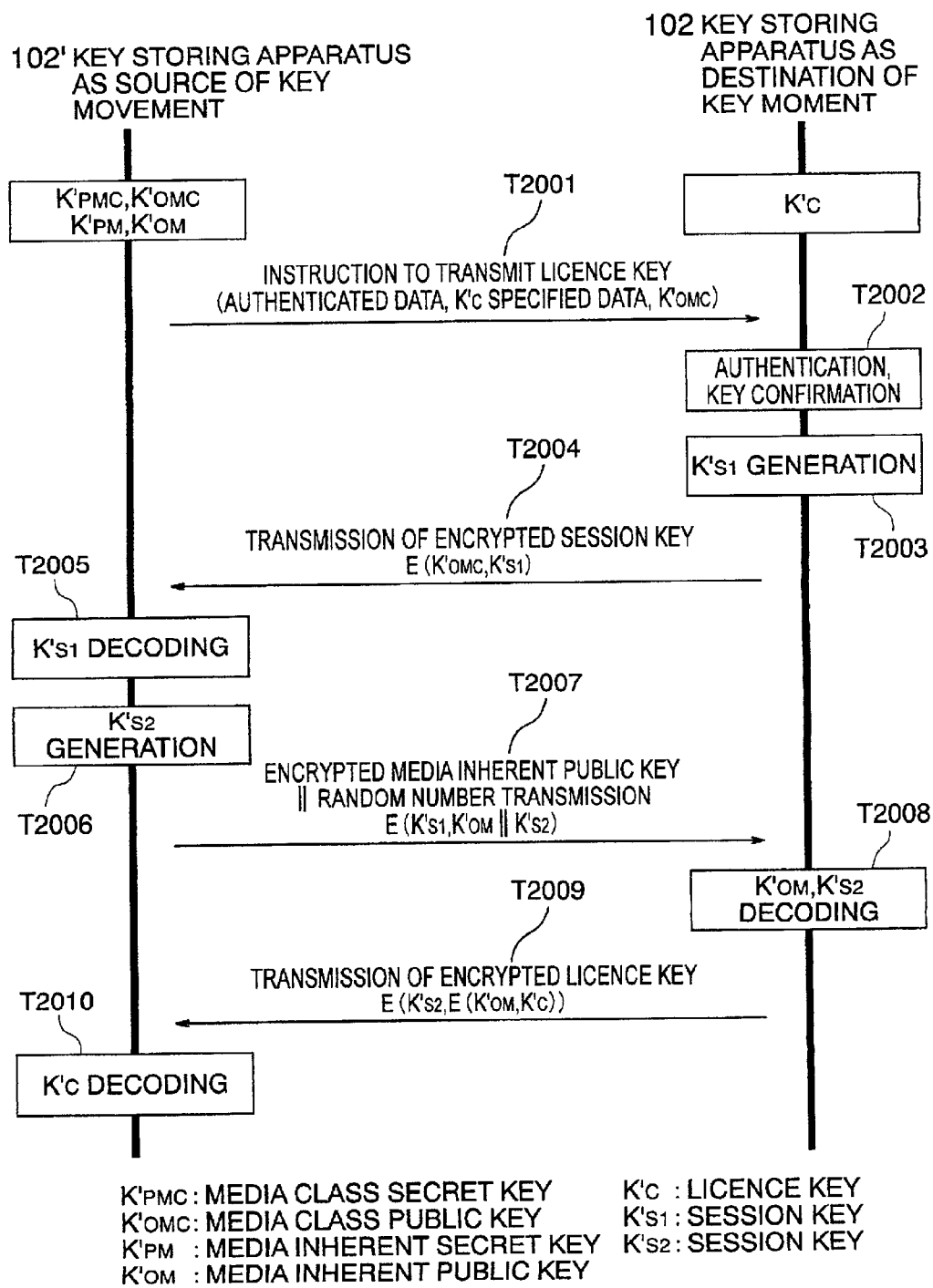

HUB APPARATUS WITH COPYRIGHT PROTECTION FUNCTION

BACKGROUND OF THE INVENTION

The present invention relates in general to a technology for protecting literary works such as the contents by utilizing the licences. More particularly, the invention relates to means and a system for providing the copyright protection function on the basis of the licence for an information processing system which does not have the copyright protection function and for managing the literary works such as the licences and the contents which are stored in general apparatuses which are electrically connected to the system.

There has been proposed the service in which the contents such as motion pictures or the musics are distributively transmitted by the communication means such as the internet or the satellite broadcasting. Since the information of the contents (the contents data) which are handled in such a distributive transmission system is digitized and hence is easy to be duplicated, it is important to protect the copyright relating to the contents. As for the means for protecting the copyright, there has been proposed a method wherein the contents data is encrypted to be distributively transmitted. More specifically, the contents data is encrypted by the public key cipher system or the like, and at the same time, the key which is used to decode the contents data thus encrypted is generated. Since if there is not the key corresponding to the contents data thus encrypted, the encrypted contents data can not be reproduced, this key is managed as the licence, whereby the unfair use of the contents can be prevented, and also the right of the contents which an author has can be protected. The technique for encrypting such contents data to transmit distributively the encrypted contents data, for example, is disclosed in JP-A-2000-138664.

In the service of transmitting distributively the contents based on the copyright protection technique as described above, the method of distributing safely the licence of the contents become important.

As for the method of distributing safely the licence, there has been proposed a method of giving a communication terminal the licence only while the communication terminal is being electrically connected to a licence giving apparatus. Such a technique, for example, is disclosed in JP-A-11-203249.

SUMMARY OF THE INVENTION

In the case where the contents distributive transmitting service with as the premise the fact that the licence key is moved between the terminals by the measure such as the marketing or the conveyance is carried out, in order to prevent the contents from being unfairly used, it is required to prevent that the licence key which is used to decode the contents data is acquired by a person other than the proper owner. Therefore, there is required the key storing device for keeping safely the licence key in order to prevent that any of persons other than the proper owner acquires the licence key. For the key storing apparatus thus required, the resistance against the physical and electrical attack made from the outside is required. In addition, the key storing apparatus, in order to carry out the safe communication with other key storing apparatus, the contents reproducing apparatus or the like, needs to include the function of authenticating the other party of the communication and the function of carrying out the communication with the other party on the basis of the encryption in such a way that the communication is not carried out with any of other apparatuses other than the proper apparatus for which the right of utilizing the key is accepted.

Now, the terminals such as the personal computers (PCs) which come currently into wide use, and the storage devices such as the hard disc devices do not have the copyright protection function at all. In order to get the contents distributive transmission service utilizing the licence key at the conventional terminal, the storage device with the copyright protection function needs to be newly prepared. However, exchanging the PC or the storage device of the existing information processing system over to the apparatus or the device with the copyright protection function imposes a burden on a user.

In addition, in the prior art of giving the communication terminal the permission for the use of the contents only while the communication terminal is being connected to the licence giving apparatus, since the licence is not actually moved to the communication terminal, it is impossible that after having detached the portable terminal from the licence giving apparatus, the contents are reproduced on the portable terminal, and the licence is moved from the communication terminal which is holding the licence to other communication terminal.

In addition, in the information processing system with the copyright protection function based on the licence key, there may be the case where the contents data which is possessed is distributively stored in a plurality of apparatuses or devices, and the licence key corresponding thereto is also distributively stored in a plurality of storage apparatuses or devices. In this case, the contents data which has been encrypted and the licence key need to be separately managed. For example, when reproducing the contents, a set of licence key and contents data needs to be located together with each other from a plurality of storage apparatuses or devices, and hence the data management becomes very complicated.

In the light of the foregoing, the present invention has been made in order to solve the above-mentioned problems associated with the prior art, and it is therefore an object of the present invention to provide an apparatus which is capable of providing readily a copyright protection function for the existing information processing system with no copyright protection function without adding the large change such as the exchange of a storage apparatus or device, a contents reproducing system with the copyright protection function utilizing the apparatus, and an apparatus and a method for carrying out the data management in the above-mentioned system without making a user conscious of the fact the copyright protection function is provided so that the processing becomes complicated.

In order to attain the above-mentioned object, according to the present invention, there is provided a key storing apparatus for keeping safely a licence key which is used to decode the contents data which has been encrypted, the apparatus including: a secure storage area which has the resistance against the attack from the outside in order to protect the key stored in the key storing apparatus against the unfair access; authentication means for authenticating the other party of the communication in the outside of the secure storage area for the secure storage area; and cipher communication means for carrying out safely the communication.

In addition, the storage apparatus is provided with an interface for the connection to the existing information processing system. Further, the storage apparatus is provided with a hub apparatus to which one or more contents storing devices, a key storing apparatus, a contents reproducing apparatus, other apparatuses for the information processing, and the like can be electrically connected at the same time.

In addition thereto, a controller of the hub apparatus with a copyright protection function includes means for acquiring the information such as an apparatus name, a classification, a manufacturer name, an access method and an apparatus state of the various kinds of apparatuses and devices such as a content storing device, a key storing apparatus and a contents reproducing apparatus all of which are electrically connected to the hub apparatus. In addition, the controller thereof includes means for managing the contents data, the key data and the like, which are all stored in the apparatus group, on the basis of the information or the like which is obtained by the acquiring means. Also, the various kinds of apparatuses and devices which are electrically connected to the hub apparatus includes means for enabling the copyright protection function to be used by utilizing the licence key stored in the key storing apparatus.

Further, the means for enabling the copyright protection function to be used is constructed in such a way as to reduce the burden imposed on a user due to the complicacy in the management and also to enhance the convenience for users.

BRIEF DESCRIPTION OF THE DRAWINGS

The above and other objects as well as advantages of the present invention will become clear by the following description of the preferred embodiments of the present invention with reference to the accompanying drawings, wherein:

FIG. 17 is a flow chart useful in explaining the operation of moving the licence key between the key storing apparatuses in the contents reproducing system to which the present invention is applied; and FIG. 18 is a sequence diagram useful in explaining an example of exchanging data between the key storing apparatus from which the licence key is to be moved and the key storing apparatus to which the licence key is to be moved.

DESCRIPTION OF THE EMBODIMENTS

The preferred embodiments of the present invention will hereinafter be described in detail with reference to the accompanying drawings.

Figure 1:
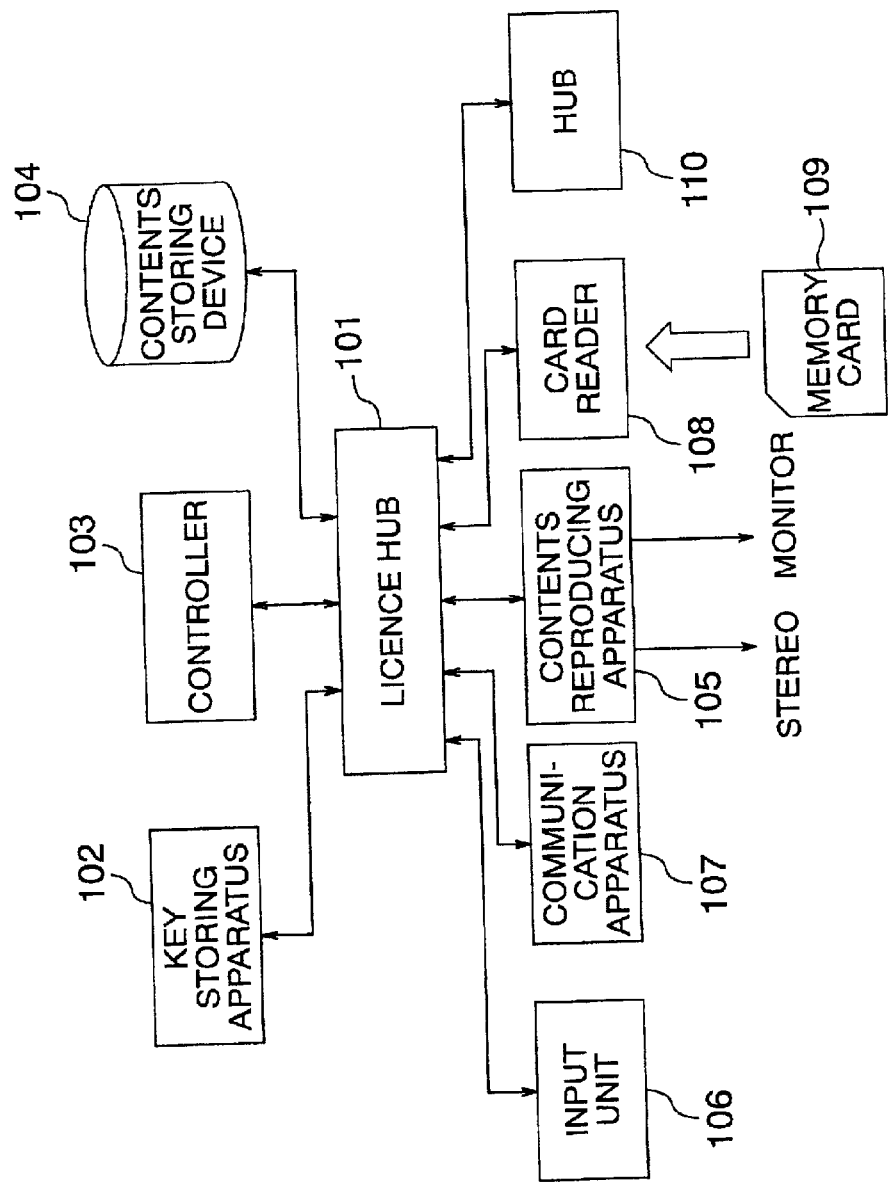
FIG. 1 is a block diagram showing a configuration of an embodiment of a contents reproducing system with a copyright protection function to which the present invention is applied.

FIG. 1 is a block diagram showing a configuration of an embodiment of a contents reproducing system with a copyright protection function which employs a hub apparatus with a copyright protection function (hereinafter, referred to as "a licence hub" for short, when applicable) to which the present invention is applied.

The contents reproducing system transmits both of contents data which has been encrypted and a licence key which is used to decode the data to a contents reproducing apparatus 105 in which the contents data is in turn decoded and reproduced using the licence key.

A licence hub 101 is electrically connected to a key storing apparatus 102, a controller 103, a contents storing device 104, an input unit 106, a communication apparatus 107, a contents reproducing apparatus 105, a card reader 108, and a hub 110. But, it is to be understood that the apparatuses to which the licence hub 101 is electrically connected are shown by way of illustration, there are conceivable the various kinds combinations of connections other than the present system.

The licence hub 101 is electrically connected to the existing information processing system through an interface such as a USB. Thus, a copyright protection function which the licence hub 101 has is provided for the existing information processing system to which the licence hub 101 is electrically connected. The licence hub 101 may have the function of connecting electrically other hub apparatuses in a multistage. In addition, the licence hub 101 may also be provided with the function which is capable of setting whether or not the copyright protection function is provided every apparatus electrically connected to the licence hub 101 to limit the range of providing the copyright protection function.

The key storing apparatus 102 is the apparatus in which the licence keys are stored. The key storing apparatus 102 is utilized in the form of the medium for use in the distribution of the licence keys to be sold in the state of storing therein a plurality of licence keys, or is used as an external storage device which is additionally provided in the licence hub 101 when the storage capacity of the key storing apparatus 102 self-contained in the licence hub 101 is filled up.

The controller 103 supervises and controls the apparatus group electrically connected to the licence hub 101, the network through which the apparatuses thus connected are electrically connected to one another (a set of the apparatuses connected thereto and the network will hereinafter be referred to as "the licence network" for short, when applicable), and the data which is present on the licence network. The controller 103 may be either a PC or self-contained in the licence hub 101 in the form of a micon for incorporation. In the host oriented interface such as a USB, the host of the interface of interest may play a part of the controller 103. In the peer-to-peer interface complied with IEEE1394 or the like, the controller which is self-contained in each of the apparatuses and the devices electrically connected to the interface of interest may have the function of the controller 103. In addition, instead of the centralized control method by one controller, there may also be adopted the distributed control method wherein the function which the controller 103 has is realized by the controller provided on one or more devices.

The contents storing device 104 is the device in which the contents data which has been encrypted, the data of the ordinary sentence which does not need to be encrypted, and the like are stored. More particularly, the contents storing device 104 is the storage device such as an HDD, a DVD, or a CD-ROM.

The contents reproducing apparatus 105 is the apparatus for decoding and reproducing the encrypted contents data by utilizing the associated one of the licence keys. As for the contents reproducing apparatus 105, there is conceivable the form such as the stationary or portable playback dedicated apparatus, or the form such as the chip which is to be incorporated in the apparatus such as the portable telephone or the PDA.

The input unit 106 is constituted by the various kinds of buttons, the touch panel and the like and serves to accept the inputs corresponding to the various kinds of instructions such as the playback, the movement and the deletion of the data from a user. The input unit 106 may be the input unit which the controller 103 has or the input unit which each of the various kinds of apparatuses on the licence network has. In the case where the controller 103 includes the input unit, the input unit 106 may not be electrically connected thereto.

The communication apparatus 107 is electrically connected to the portable telephone, the stationary telephone, the adapter of the LAN, or the like, and is used to access the contents distributive transmission center (not shown) for transmitting distributively the encrypted contents data and the licence keys through the network such as the radio communication, the on-line system or the internet. In addition, the licence keys and the contents data can also be transmitted and received to and from other licence networks through the communication apparatus 107.

The card reader 108 is the device for reading out and writing the data from and to the detachable storage medium such as the memory card 109. The memory card 109 can be utilized as the contents storing device 104, and in addition thereto, if the memory card 109 has the same copyright protection function as that of the key storing apparatus 102, can also be utilized as the key storing apparatus 102.

The hub 110 has, as the concentrator, the function of connecting electrically thereto one or more apparatuses, and is the apparatus for enhancing the extendability of the licence network. The hub 110 may be configured in such a way as to enable the multistage connection to be carried out to enhance further the extendability of the licence network. The hub 110 does not need to have necessarily the same function as that of the licence hub 101, and hence may be the normal hub apparatus with no copyright protection function. In this case, there may also be adopted the configuration in which the licence hub 101 can provide the copyright protection function equal to that of the apparatus, which is directly electrically connected to the licence hub 101, for the apparatus as well which is indirectly electrically connected to the licence hub 101 through the hub 110 with no copyright protection function.

According to the present system, it is possible to realize the function in which the licence hub 101 is electrically connected to one end of the existing information processing system, thereby adding the copyright protection function to the overall system.

Figure 2:
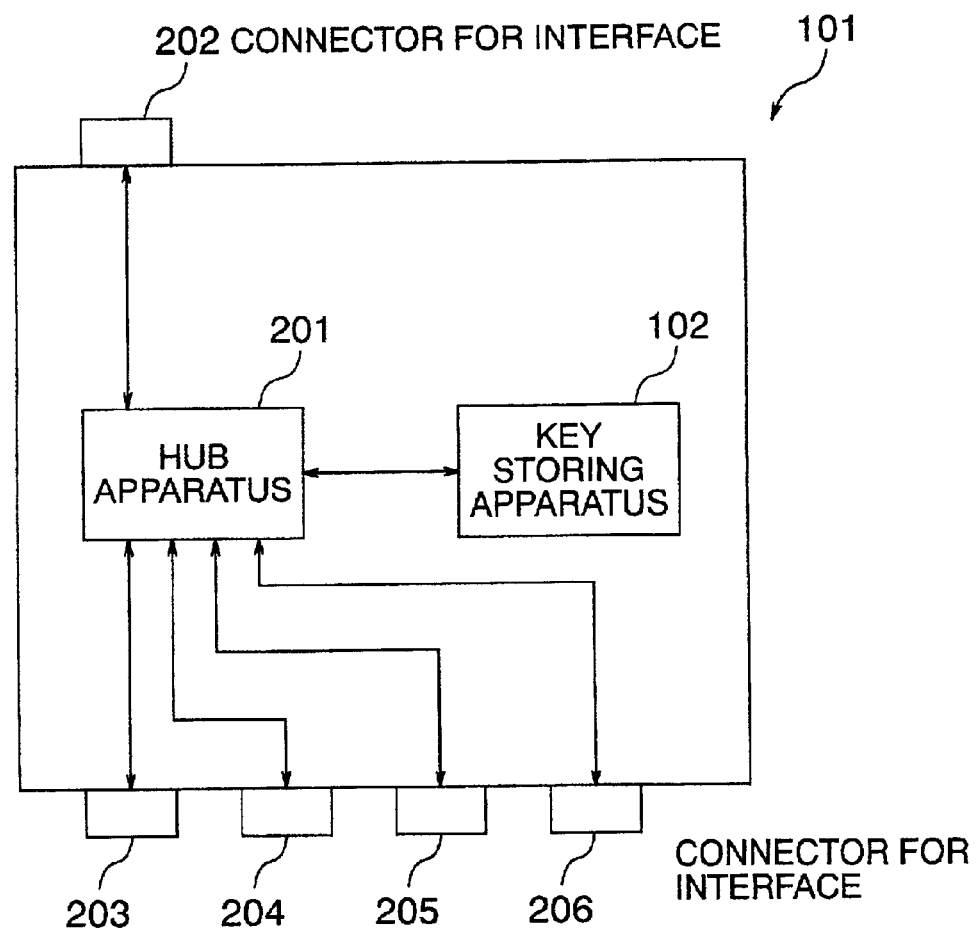
FIG. 2 is a block diagram showing a configuration of a licence hub 101.

FIG. 2 is a block diagram showing a configuration of the licence hub 101 to which the present invention is applied. The licence hub 101 includes a hub apparatus 201, the key storing apparatus 102, and connectors 202, 203, 204, 205 and 206 for interfaces through which the hub apparatus 201 is electrically connected to the apparatuses such as the contents storing device 104 and the contents reproducing apparatus 105, respectively. While in the figure, the five connectors are illustrated as an example, any number of connectors may be available.

The key storing apparatus 102 is used to store therein the licence keys. The licence hub 101 utilizes the licence keys which are stored in the key storing apparatus 102, thereby providing the copyright protection function for the system which is electrically connected to the licence hub 101 itself. Instead of the key storing apparatus 102 or in addition to the key storing apparatus 102, a reader for the memory card for example which has the same copyright protection function is provided therein in such a way that the key storing apparatus 102 may also be made the detachable key storing apparatus from which the memory card may also be detachable. Thereby, the extension of the storage area of the key storing apparatus 102 and the exchange of the key storing apparatus 102 in the failure can be readily carried out. In addition, the memory card may also be used as the contents storing device 104.

In addition, the licence hub 101, in addition to the key storing apparatus 102, may be provided with the device which has the same function as that of the contents storing device 104. This results in that both of the licence keys and the encrypted contents data can be kept by one licence hub 101 to enhance the convenience for users. Also, the licence hub apparatus 101 may self-contain the controller 103. Thus, only by connecting electrically one licence hub 101 to the information processing system, the information processing system of interest can realize the copyright protection function. In this case, in order to enhance the operationalization, the licence hub 101 may include the input unit and the display device for the system control.

Figure 3:
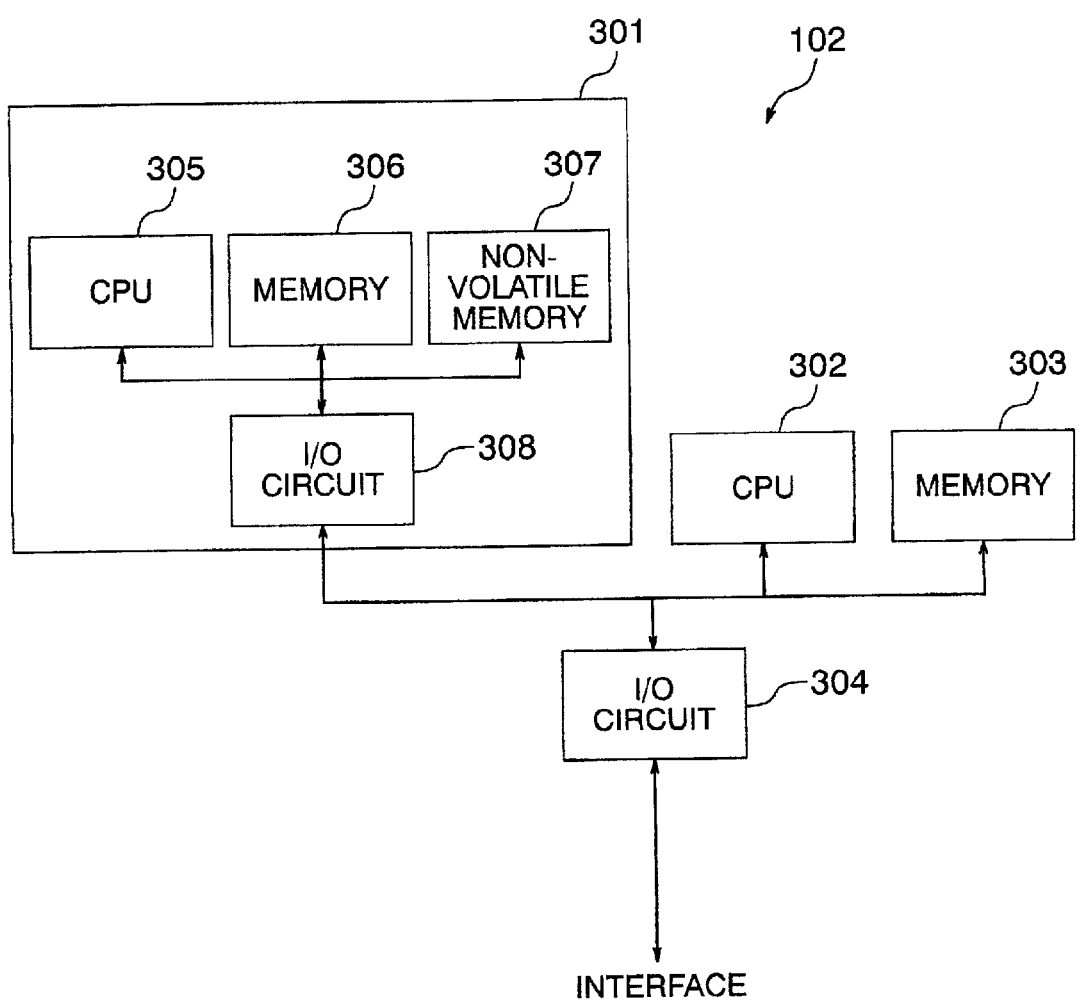
FIG. 3 is a block diagram showing a configuration of a key storing apparatus 102.

FIG. 3 is a block diagram showing a configuration of the key storing apparatus 102.

The key storing apparatus 102 includes a tamper resistant module 301, a CPU 302, a memory 303 and an I/O circuit 304 all of which serve to store the keys.

The tamper resistant module 301 has the resistance against the attack made from the outside, and includes therein a CPU 305, a memory 306, a nonvolatile memory 307, and an I/O circuit 308. The CPU 305 supervises and controls each of the circuits provided in the tamper resistant module 301. Also, the CPU 305 has the authentication function and the encryption decoding function. The memory 306 includes a ROM and a RAM. The program with which the CPU 305 controls supervisably each of the parts of the tamper resistant module 301, and the program for realizing the authentication function and the encryption decoding function are both stored in the ROM. The RAM functions as the work area of the CPU 305. The licence keys are stored in the nonvolatile memory 307. The I/O circuit 308 is the interface through which each of the parts of the tamper resistant module 301 communicates with the outside. The tamper resistant module 301 may be constituted by either a plurality of chips or one chip. In the case where the tamper resistant module 301 is constituted by one chip, the risk when analyzing the signals which are used in the communication between the chips is reduced and hence the security is necessarily enhanced. In addition, the tamper resistant module 301 may be replaced with the memory card with the copyright protection function which has the same function as that thereof. In this case, the memory card may be either non-detachable or detachable.

The CPU 302 controls the communication established between the tamper resistant module 301 and the external apparatus. The CPU 302 has the function of converting the command in accordance with which the data in the tamper resistant module 301 is accessed and the command for the interface which is electrically connected to the I/O circuit 304 into each other. The memory 303 includes a ROM and a RAM. Then, the program in accordance with which the CPU 302 converts the commands into each other is stored in the ROM. The RAM is used as the work area of the CPU 302.

The key storing apparatus 102 may be constituted by either a plurality of chips or one chip. In the case where the key storing apparatus 102 is constituted by one chip, the risk when analyzing the signals which are used in the communication between the chips is reduced and hence the security of the key storing apparatus 102 is necessarily enhanced.

Figure 4:
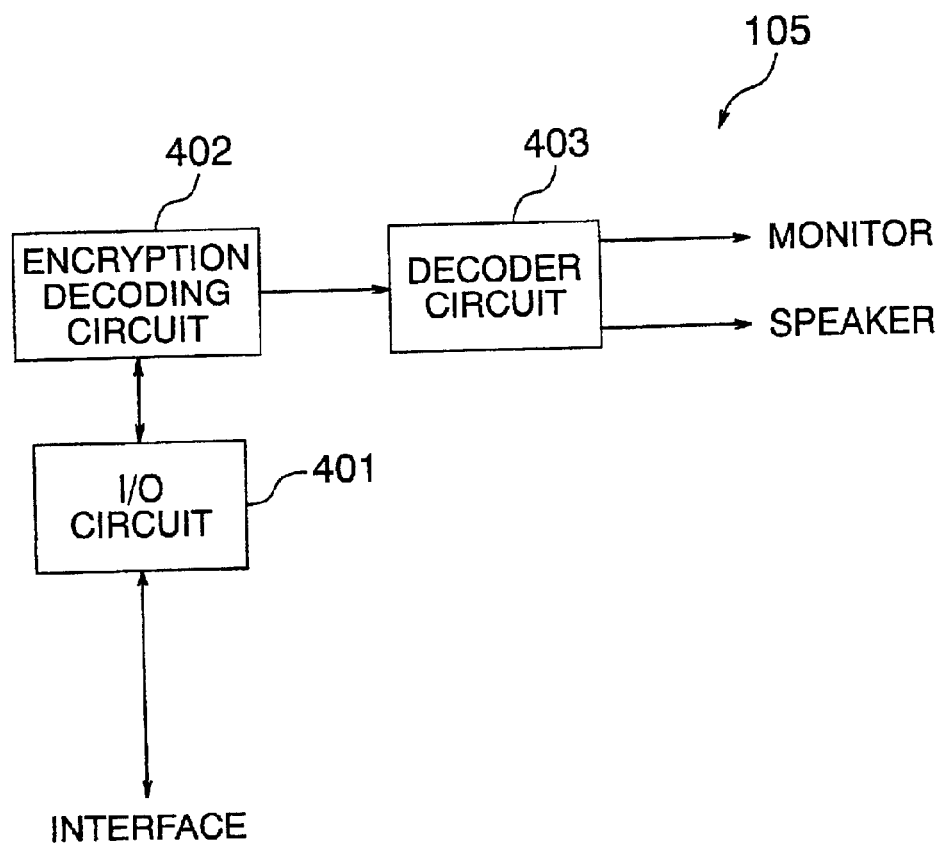
FIG. 4 is a block diagram showing a configuration of a contents reproducing apparatus 105.

FIG. 4 is a block diagram showing a configuration of the contents reproducing apparatus 105 for reproducing the encrypted contents data. The contents reproducing apparatus 105 includes authentication means for getting the authentication from the key storing apparatus 102, cipher communicating means for receiving the key from the key storing apparatus 102, and cipher processing means for encoding the encrypted contents data using the key thus received.

The contents reproducing apparatus 105 is constituted by an I/O circuit 401, an encryption decoding circuit 402, and a decoder circuit 403. The I/O circuit 401 is used to communicate with the external apparatus through the interface such as a USB. The encryption decoding circuit 402 is used to carry out the cipher communication with the key storing apparatus 102. In addition, the encryption decoding circuit 402 decodes the encrypted contents data using the associated one of the licence keys. The decoder circuit 403 has the function of reproducing the encrypted contents data, and the function of carrying out the connection to the monitor or the speaker for outputting the contents. The monitor or the speaker may be either self-contained in the contents reproducing apparatus 105 or electrically connected to the contents reproducing apparatus 105. Then, the contents reproducing apparatus 105 may be constituted by either a plurality of chips or one chip. In the case where the contents reproducing apparatus 105 is constituted by one chip, the risk when analyzing the signals which are used in the communication between the chips is reduced, and hence the level of the security of the contents reproducing apparatus 105 is necessarily enhanced.

Figure 5:
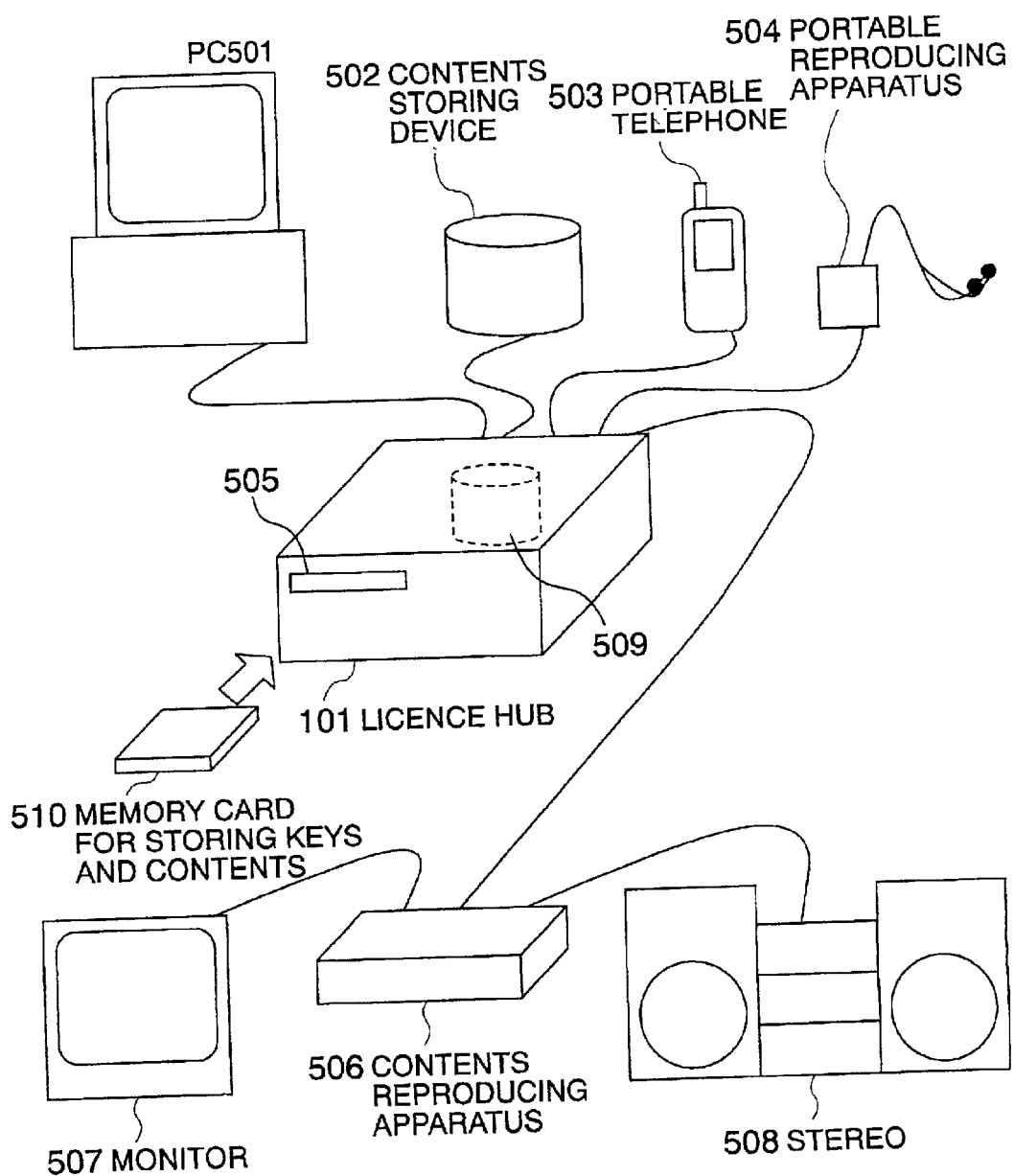
FIG. 5 is a schematic view showing an exterior appearance of an embodiment of a contents reproducing system to which the present invention is applied.

FIG. 5 is a schematic view showing a concrete example of the contents reproducing system with a copyright protection function which is constituted by the licence hub 101.

In the figure, for example, a PC 501, a contents storing device 502, a portable telephone 503, a portable reproducing apparatus 504, a memory card reader 505, a contents reproducing apparatus 506 and the like are electrically connected to the licence hub 101, thereby constructing the contents reproducing system.

The contents data can be stored in a memory card 510. When the memory card 510 has the copyright protection function, the licence keys can also be stored therein. In addition, the memory card 510 may be mounted to other contents network or the associated one(s) of the various kinds of reproducing apparatuses to carry out the movement or the playback of the contents.

The PC 501 has the function as the controller of the licence hub 101, the function of relaying through the internet the communication which the key storing apparatus carries out with the contents distributive transmission center in order to accept the issue of the licence key, the function of down loading the contents data from the internet to store the data in the self-contained HDD, and the like.

The contents storing device 502 is the storage device such as an HDD, a DVD, or a CD-ROM, and is used to store therein the encrypted contents data and the like. In addition, the contents storing device 502 may be self-contained, as the contents storing device 509 for being self-contained, in the licence hub 101 in some cases.

The portable telephone 503 has the function of down loading the licence key(s) and the contents data from the licence network or the contents distributive transmission center (not shown), the function of reproducing the contents stored in the storage device self-contained therein, and the like. The storage device which is self-contained in the portable telephone 503 may be the detachable memory card 510.

The portable reproducing apparatus 504 down loads the licence key(s) and the contents data from the licence network to the storage device self-contained therein to reproduce the contents data. The memory card 510 or the like may also be utilized as the detachable storage device.

The contents reproducing apparatus 506 decodes the encrypted contents data using the licence key to output the resultant data to a monitor 507, a stereo 508 or the like.

In FIG. 5, while the apparatuses are electrically connected to one another through the associated cables, respectively, the wireless communication form may also be available.

Figure 6:
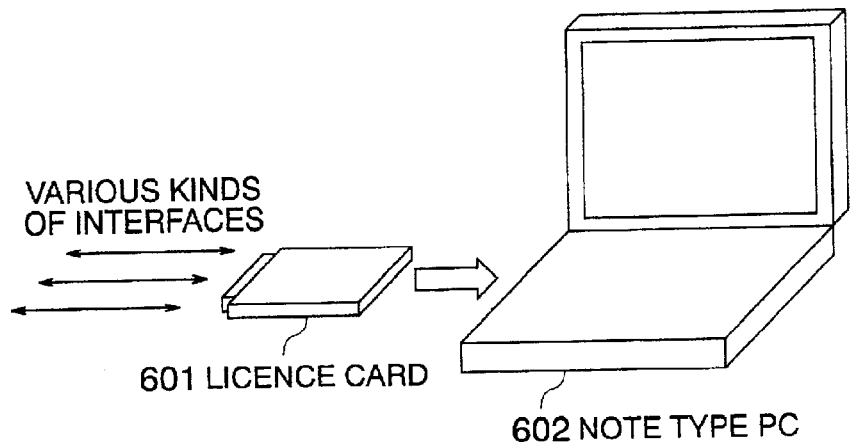
FIG. 6 is a schematic view showing a concrete example 8a licence card) of the licence hub apparatus 101.
Figure 7:
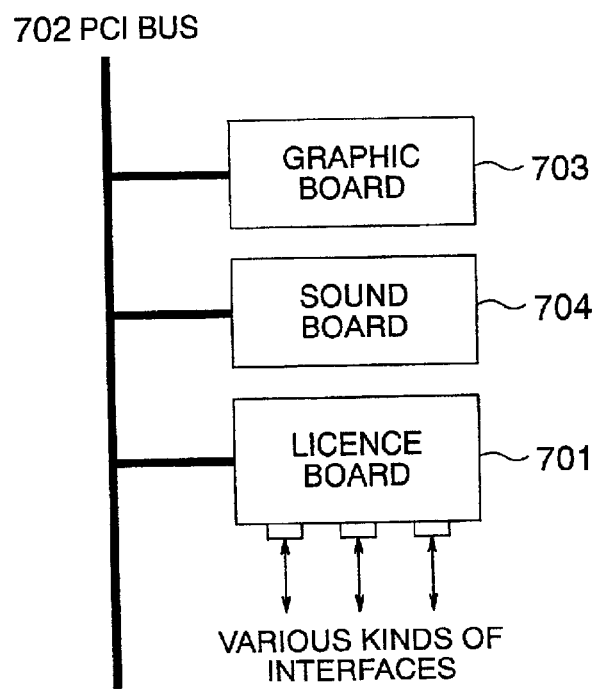
FIG. 7 is a block diagram showing a configuration of a concrete example (a licence board) of the licence hub apparatus 101.

A concrete example of the licence hub 101 is shown in FIGS. 6 and 7.

In FIG. 6, a licence card 601 is the card type licence hub 101. The licence card 601 has the connectors for the interfaces corresponding to a PC card, a compact flash, a USB and the like, and is directly electrically connected to a note type personal computer 602, a PAD (not shown) and the like. Also, in addition to the above-mentioned interfaces, the licence card 601 has one or more connectors for the various kinds of interfaces such as the USB and the IEEE1394 to provide the copyright protection function for the various kinds of apparatuses which are electrically connected to these interfaces. In addition, the licence card 601 may have an interface(s) for the wireless communication instead of one or more connectors. The licence card 601 may self-contain the contents reproducing apparatus 105 which is constituted by one chip. By adopting such a configuration, only by mounting the licence card 601 to a note type personal computer 602, the contents data can be reproduced. In order to extend the storage capacity, and so forth, the licence card 601 may also be provided with the detachable mechanism of the memory card type key storing apparatus 102.

In FIG. 7, a licence board 701 is a PCI board type licence hub 101. The licence board 701 has one or more conntentors for the various kinds of interfaces such as a USB, and is electrically connected to a PCI bus 702 of the PC to realize the licence hub function. By the way, the licence board 701 may also have the interface for utilizing the bus such as an ISA in addition to a PCI bus. When reproducing the contents, in order to enhance the level of the security of the system, the licence board 701 does not let the decrypted contents data flow onto the PCI bus. For this reason, the contents reproducing apparatus 105, which is constituted by one chip, as shown in FIG. 4, is loaded on a graphic board 703 or a sound board 704.

Figure 8:
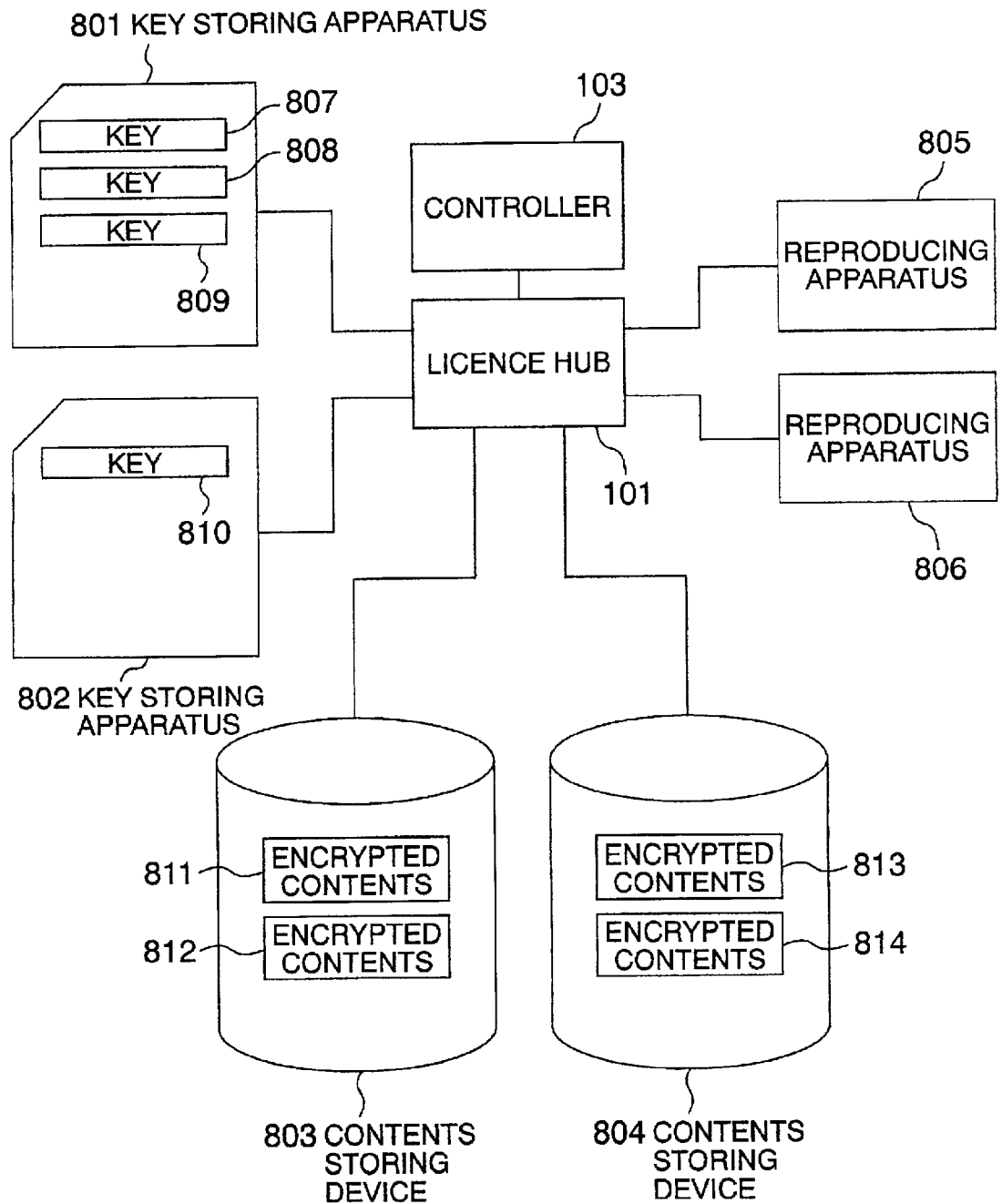
FIG. 8 is a block diagram useful in explaining the processing in the inside of a licence network.

FIG. 8 is a block diagram showing a configuration of the licence network which is formed by using the licence hub 101. One or more key storing apparatuses 801 and 802 (each of them has the same configuration as that of the key storing apparatus 102), one or more contents storing devices 803 and 804 (each of them has the same configuration as that of the contents reproducing apparatuses 805 and 806 (each of them has the same configuration as that of the contents reproducing apparatus 105) can be electrically connected to the licence hub 101. The apparatuses and devices may be arranged in arbitrary places on the licence network, and the licence hub 101 relays the communication, of the licence keys, the encrypted contents data, the data of the ordinary sentence which does not need to be encrypted, and the like, which communication is established between these apparatuses and devices.

The controller 103 manages the information such as the list of the apparatus names, the classification, the manufacturer, the access method and the apparatus states of the various kinds of apparatuses and devices which are electrically connected to the licence hub 101 or the licence network to which the licence hub 101 belongs. Now, as for the apparatus states, there are taken as an example the list of the licence keys which are stored in the key storing apparatus 801 or the like, the list of the contents data which is stored in the contents storing apparatus 803 or the like, the list of the reproducible contents of the contents reproducing apparatus 803 or the like, and the like.

When the controller 103 has received the instruction to reproduce the contents or to move the licence key(s) from a user, the controller 103, by utilizing the managed information, determines the apparatuses suitable for executing the processing, which is instructed by a user, among the one or more key storing apparatuses 801 and 802, the one or more contents storing apparatuses 803 and 804, and one or more contents reproducing apparatuses 805 and 806 all of which are electrically connected thereto to instruct the apparatuses thus determined to reproduce the contents or to move the licence key(s). The key storing apparatuses 801 and 802, and the contents reproducing apparatuses 805 and 806, in order to carry out safely by the communication of the licence key(s), have the means for authenticating the apparatus of the other party and the cipher communicating means. After the instruction has been issued from the controller 103, the processing of reproducing the contents or moving the licence key(s) is executed among the apparatuses each of which has received the instruction. In the case of the processing of moving the encrypted contents or carrying out the copy, since there is no need of taking the security into consideration, the contents storing apparatus 803 and the like do not need to include the unique communication means. In the processing in this case, the controller 103 carries out the control of the processing.

Figure 9:
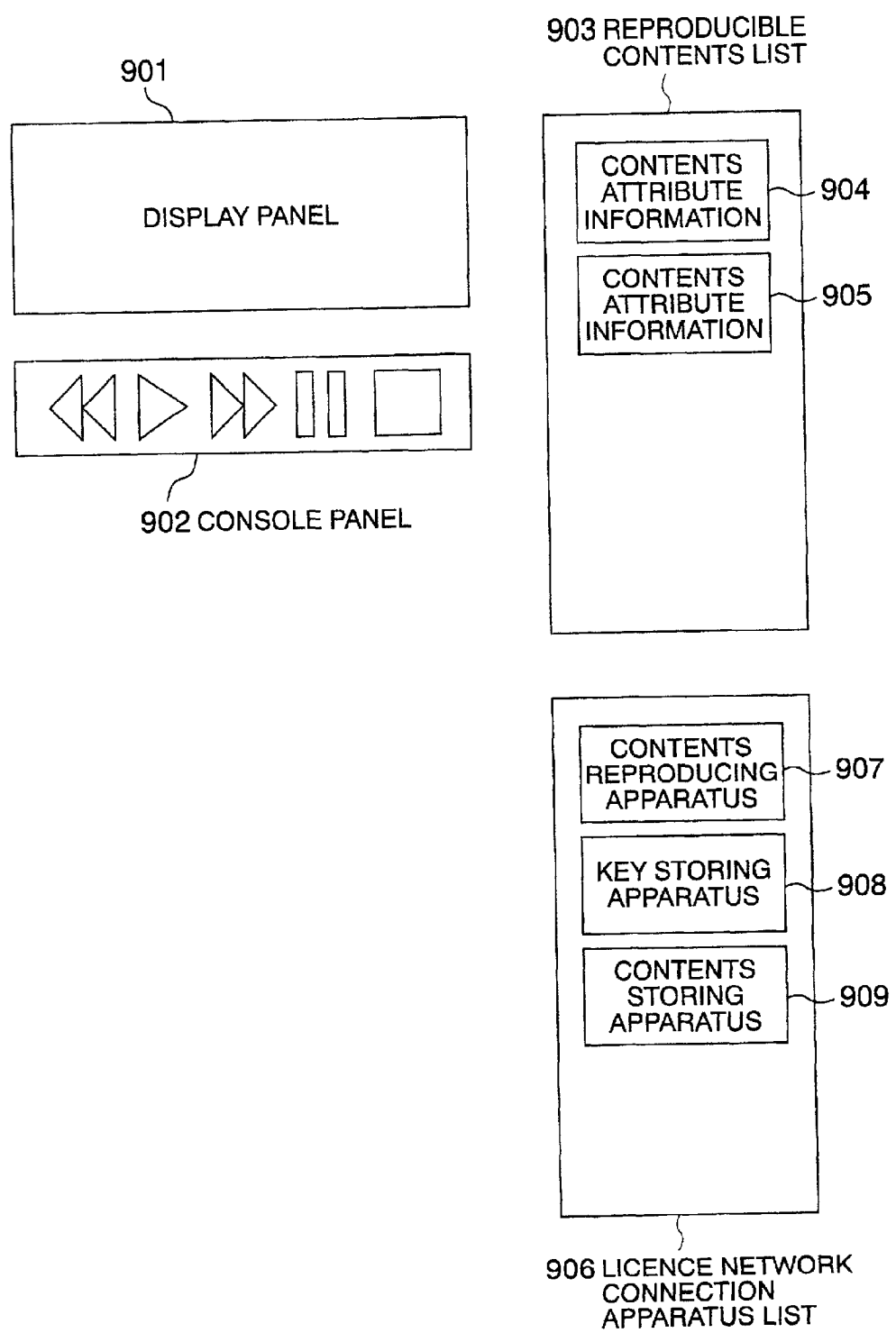
FIG. 9 is a schematic view showing an example of a user interface of an application which is used when reproducing the contents in the present invention.

FIG. 9 is a schematic view showing the user interface of the application which is used when reproducing the contents. This application is operated on the controller 103 which is electrically connected to the licence network for example to control the processings of the playback of the contents, the movement of the licence key(s), and the like. The user interface is constituted by a display panel 901, a console panel 906, a reproducible contents list 903, a licence network connection apparatus list 906 and the like.

The display panel 901 displays thereon the current operation situation of the application, the attribute information such as the name of the contents, the recording time, the author name, the distributor name, and the name of the possessor of the licence, and the like.

The buttons which are used to carry out the manipulations such as the playback, the stop, the rewind and the quick traverse are arranged on the console panel 902.

The list of the contents which can be reproduced in the licence network is displayed on the reproducible contents list 903. Also, attribute information 904, 905 and the like such as the name of the contents and the recording time are displayed on the contents list 903. Then, the contents which have the contents data, but have no licence key, and the non-reproducible contents which have the licence key, but have no contents data are distinguished from the reproducible contents by the display methods wherein the contents themselves are not displayed, the contents are displayed in the different color(s), the mark is put with the icon, and so forth. By carrying out such display, a user does not need to be made conscious of the complicacy of the system that the contents keys and the contents data are separately managed, and hence the convenience for users is enhanced.

The list of the various kinds of apparatuses and devices which are electrically connected to the licence network and which are recognized by the controller 103 and the like is displayed on the licence network connection apparatus list 906. Also, the icons such as a contents reproducing apparatus 907, a key storing apparatus 908, and a contents reproducing apparatus 909 which show the contents reproducing apparatus and the like, respectively, are displayed on the licence network connection apparatus list 906. Then, the playback of the contents, and the apparatus(es) which is (are) used when moving the contents are specified on the basis of the icons of interest.

In addition, when moving the contents, there is provided the function in which only by specifying the contents name and the destination of the movement, the controller 103 or the like retrieves the contents data into which the corresponding contents are encrypted, and the places where the licence key is kept which is used to decode the contents data, and the movement or copy of the contents data and the movement of the licence key(s) are carried out all at once. By the provision of the present function, a user does not need to find out separately the apparatuses in which the contents data becoming an object of the movement, and the licence key(s) of an object are respectively stored and to specify the storage places with respect to them, and hence the convenience for users is necessarily enhanced. In addition, since the operation which is required for a user to issue the instruction to carry out the movement of the key(s) is removed, the operationalization is also enhanced.

In addition, there is provided the function in which the controller 103 or the like retrieves the licence key(s) or the contents data, which a user hopes to get, from the apparatus group on the licence network. Also, there is provided the function in which the results of this retrieval processing are displayed as the licence key list or the contents data list together with the attribute information such as the name of the contents data.

The apparatus information, which the controller 103 electrically connected to the licence hub 101 has, of the reproducing apparatus which is electrically connected to the licence network and which can be used when reproducing the contents needs to be updated in accordance with the change of the state of the licence network. As for the method of updating the information, there is the method wherein for example, the controller is given the list of the reproducing apparatuses which are electrically connected to the licence network, and all of the apparatuses and the devices on the network are scanned at periodic intervals, and when a new reproducing apparatus or device is found out on the network or there is the apparatus or the device which has been missed from the network, the reproducing apparatus list is updated. Alternatively, there may be adopted the method wherein when the reproducing apparatus is electrically connected to (or detached from) the network, the signal exhibiting the new connection (or the detachment) is let flowed onto the network, and the update processing is executed with that signal as the trigger. In addition, there may also be adopted the method wherein the apparatuses which are electrically connected to the licence network originate the signals exhibiting the presence of them at periodic intervals, and the controller 103 sums up the signals thus originated therefrom, thereby updating the list.

Figure 10:
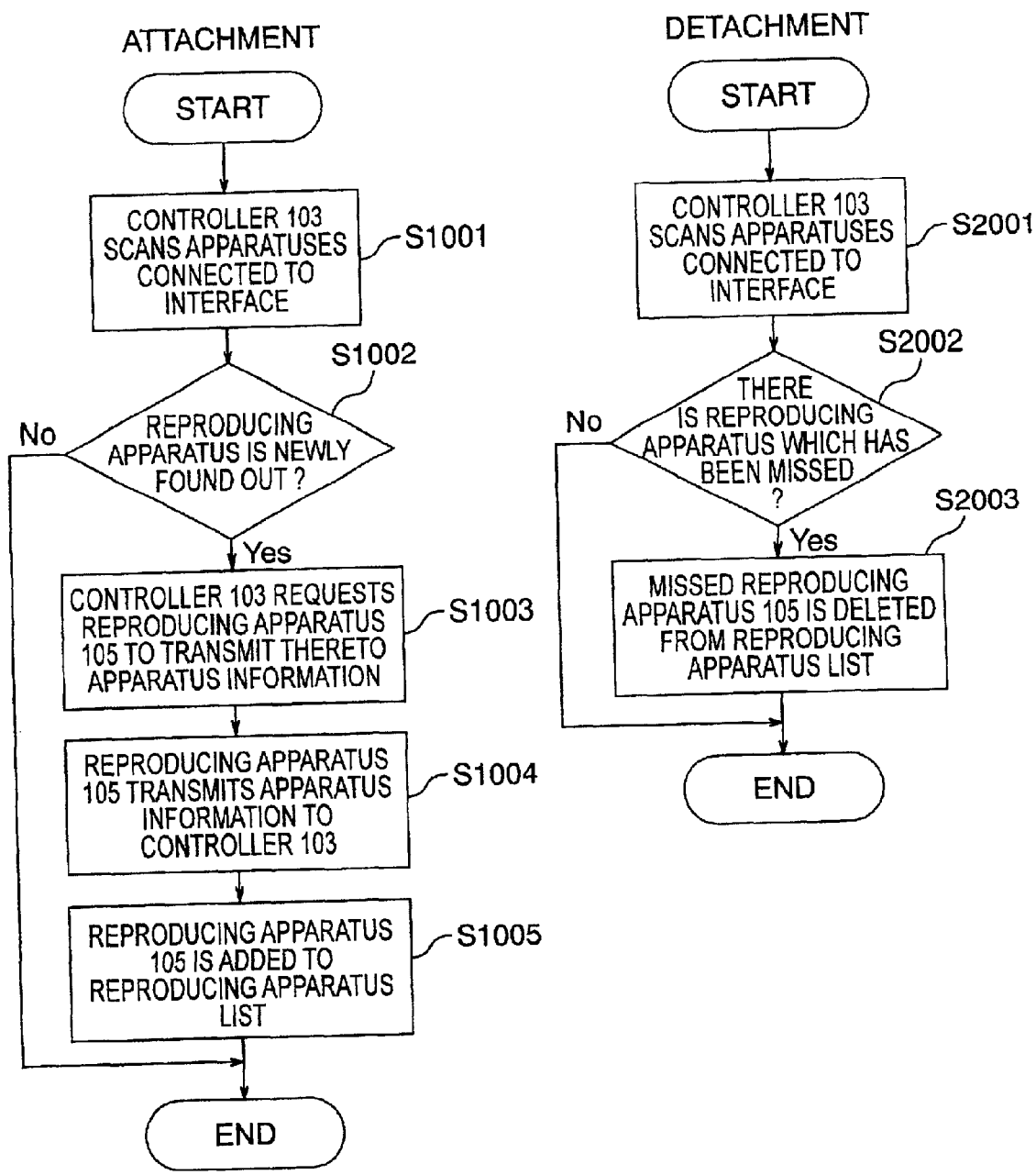
FIG. 10 is a flow chart useful in explaining the operation of recognizing a reproducing apparatus in a controller to which the present invention is applied.

FIG. 10 is a flow chart useful in explaining the processing of recognizing the reproducing apparatus(es) in accordance with the method wherein the controller 103 scans the licence network at periodic intervals.

The controller 103 scans the apparatuses, which are electrically connected to the licence network, at periodic intervals to search for the contents reproducing apparatus 105 which has been newly electrically connected to the licence network (Step S1001). When the new contents reproducing apparatus 105 has been found out on the licence network (Step S1002), the controller 103 requests the contents reproducing apparatus 105 thus found out to transmit thereto the apparatus information thereof (Step S1003). Then, the contents reproducing apparatus 105 which has accepted the request made thereto transmits the apparatus information thereof to the controller 103 (Step S1004). The controller 103 which has received the apparatus information transmitted thereto adds the information of the contents reproducing apparatus 105 which has been newly electrically connected to the licence network to the reproducing apparatus list which the controller 103 is holding (Step S1005). When there is the contents reproducing apparatus 105 which has been missed in the scanning for the licence network (Step S2001) because of the detachment thereof (step S2002), the controller 103 deletes the information of the missed contents reproducing apparatus 105 from the reproducing apparatus list.

Figure 11:
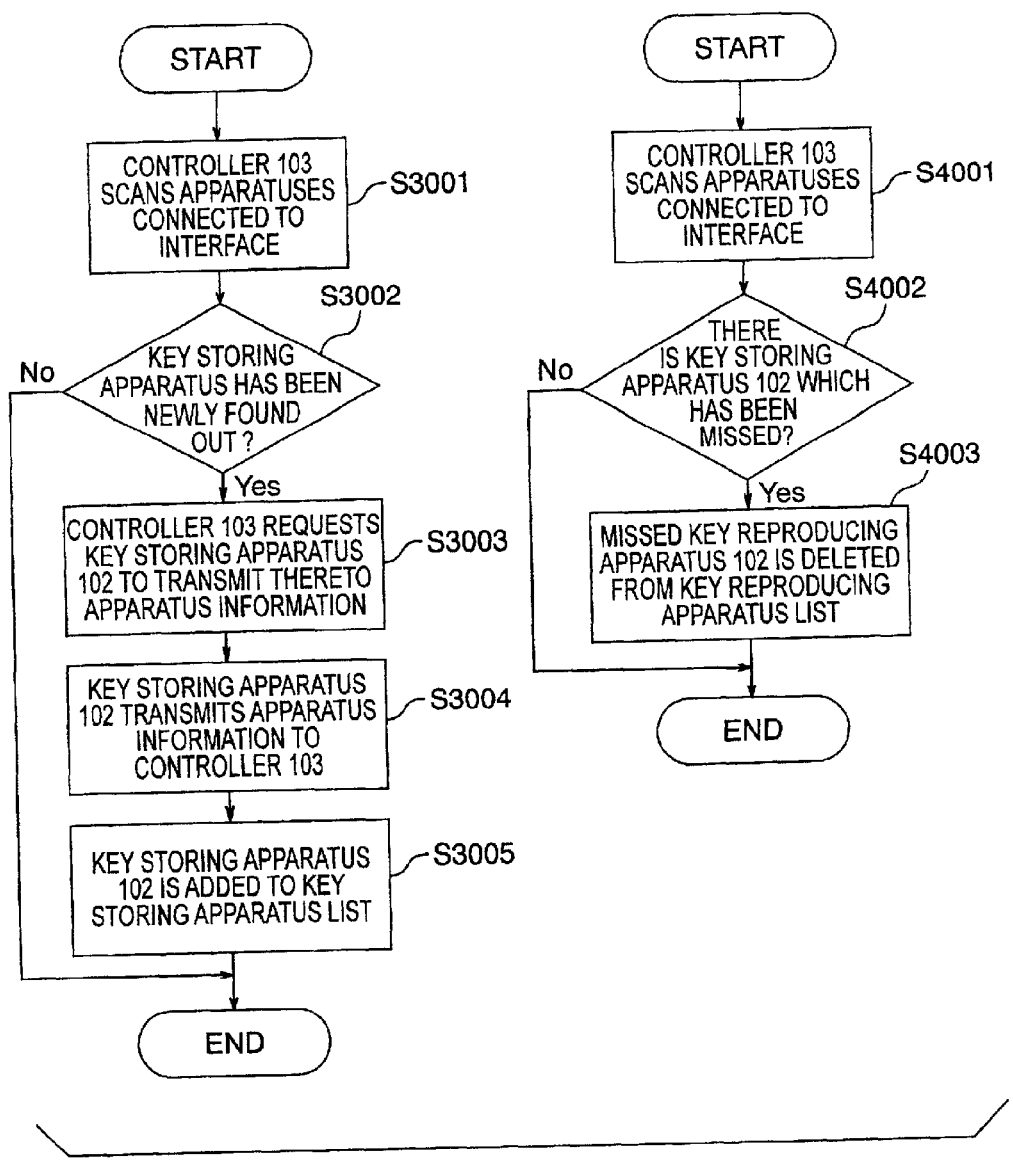
FIG. 11 is a flow chart useful in explaining the operation of recognizing a key storing apparatus in a controller to which the present invention is applied.
Figure 12:
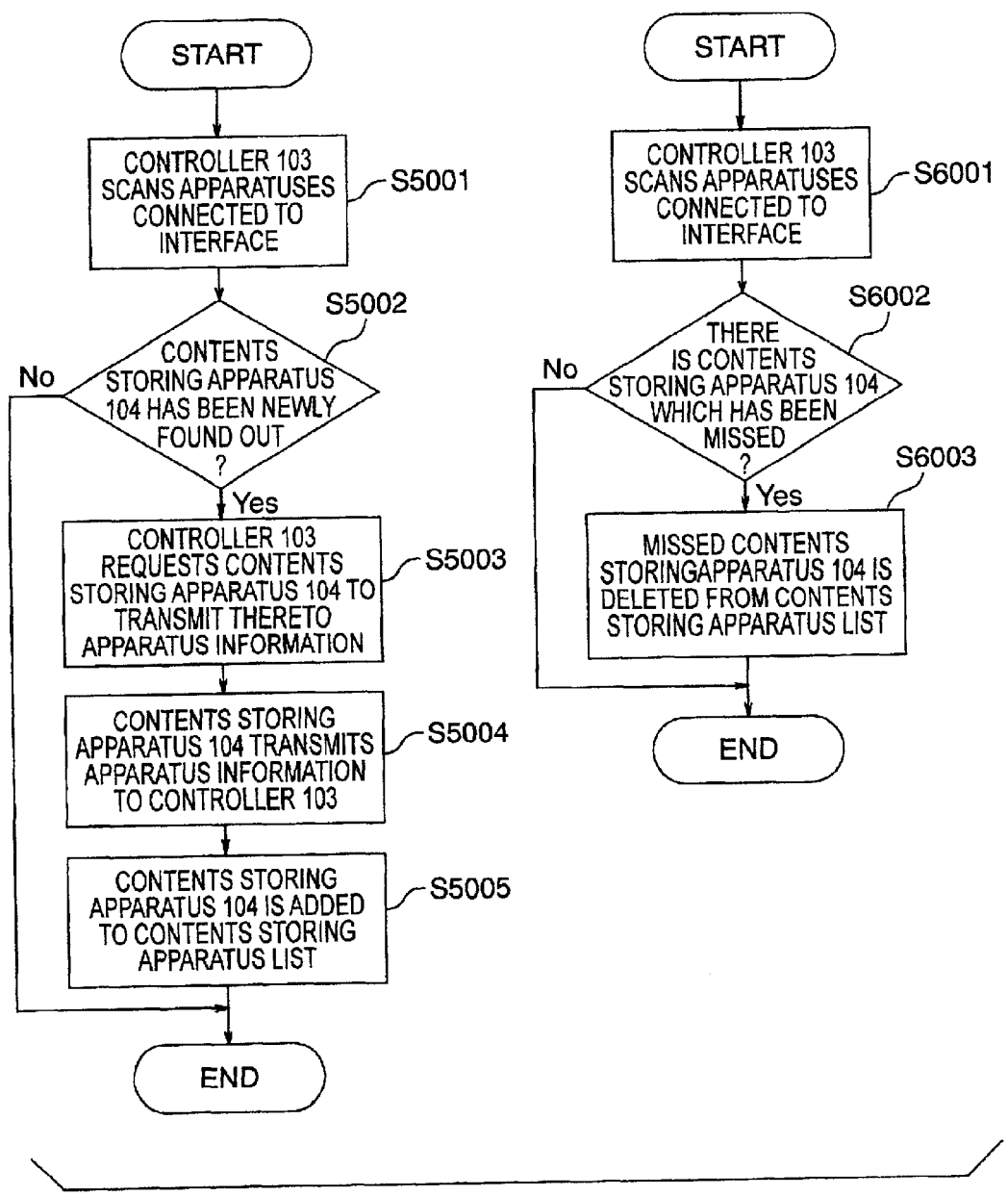
FIG. 12 is a flow chart useful in explaining the operation of recognizing a contents storing apparatus in a controller to which the present invention is applied.

With respect to the two information as well which the controller 103 itself is holding, i.e., the information of the key storing apparatus 102 which is electrically connected to the licence network, and the information of the contents storing device 104, the controller 103 carries out the update thereof similarly to the case of the recognition of the reproducing apparatus(es) at periodic intervals. FIG. 11 is a flow chart useful in explaining the processing of recognizing the key storing apparatus(es) utilizing the method of scanning the licence network at periodic intervals, and FIG. 12 is a flow chart useful in explaining the processing of recognizing the contents storing device(s) utilizing the method of scanning the licence network at periodic intervals. In each of the recognition processings, when the key storing apparatus 102 (the contents storing device 104) has been newly found out (Step S3001, Step S5001) or missed (Step S4001, Step S6001), the controller 103 updates the apparatus information list. These processings, as described in the method of recognizing the contents reproducing apparatus, may be executed with as the trigger the connection signal of the apparatus which is transmitted to the network. In addition, there may be adopted the method wherein the apparatuses originate the signals exhibiting the presence of them on the network at periodic intervals.

Figure 13:
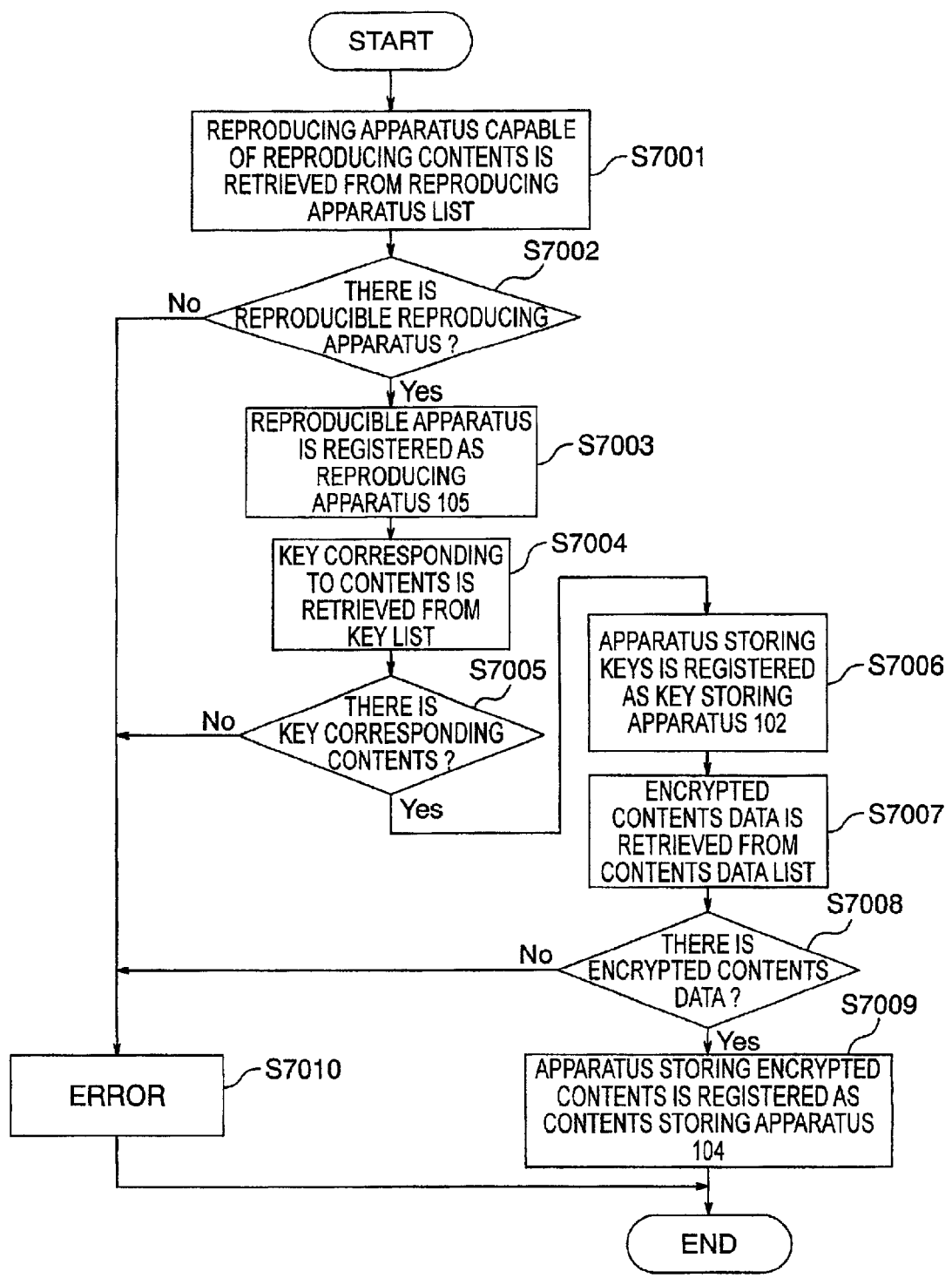
FIG. 13 is a flow chart useful in explaining the operation of determining the apparatus in the contents reproducing operation in the controller to which the present invention is applied.

FIG. 13 is a flow chart useful in explaining the procedure of determining the apparatus(es) which will be used in reproducing the contents.

When two or more contents reproducing apparatuses 105 are present on the licence network, the controller 103 selects the contents reproducing apparatus by which the contents will be reproduced (Step S7001). If the contents reproducing apparatus 105 which is capable of reproducing the contents is present on the network, then the controller 103 uses that contents reproducing apparatus 105 which is present on the network (Step S7003). In the case where a plurality of contents reproducing apparatuses 105 can reproduce the contents at the same time, the controller 103 uses one or plurality of contents reproducing apparatuses among them. When the contents reproducing apparatus 105 is determined from a plurality of utilizable contents reproducing apparatuses 105, the controller 103 utilizes the apparatus information of the contents reproducing apparatus 105 which is held by the controller 103 itself. For example, the controller 103 may select automatically the contents reproducing apparatus 105 which has the most excellent playback performance, or the contents reproducing apparatus 105 which has the most excellent playback performance may be selected by a user himself/herself. On the other hand, if the contents reproducing apparatus 105 which is capable of reproducing the contents is absent on the network, then the controller 103 processes this case as an error (Step S7010).

Next, the controller 103 searches for the licence key corresponding to the contents as an object of the playback. In the case where one or more key storing apparatuses 102 are electrically connected to the licence network, the controller 102 retrieves the licence keys stored in the key storing apparatuses 102 the information of which is registered in the key storing apparatus list to confirm whether or not the licence key as an object is present on the licence network (Step S7004). If the licence key as an object is found out, then the key storing apparatus 102 in which the licence key is stored is registered as the key storing apparatus 102 in the controller 103 (Step S7006). On the other hand, if the licence key as an object has not been found out, then since the playback of the contents is impossible, the controller 103 processes this case as an error to complete the processing (Step S7010). Next, the controller 103 searches for the encrypted contents data of the contents becoming an object of the playback (Step S7007). When one or more contents storing devices 104 are electrically connected to the licence network, the controller 103 retrieves the contents data on the contents storing devices 104 which are electrically connected to the licence network. If the contents data as an object of the playback has been found out, then the controller 103, when reproducing the contents data, uses the contents storing apparatus 104 in which the contents data as an object of the playback is stored (Step S7009). On the other hand, if the contents data as an object has not been found out, then since the playback of the contents is impossible, the controller 103 processes this case as an error (Step S7010).

Figure 14:
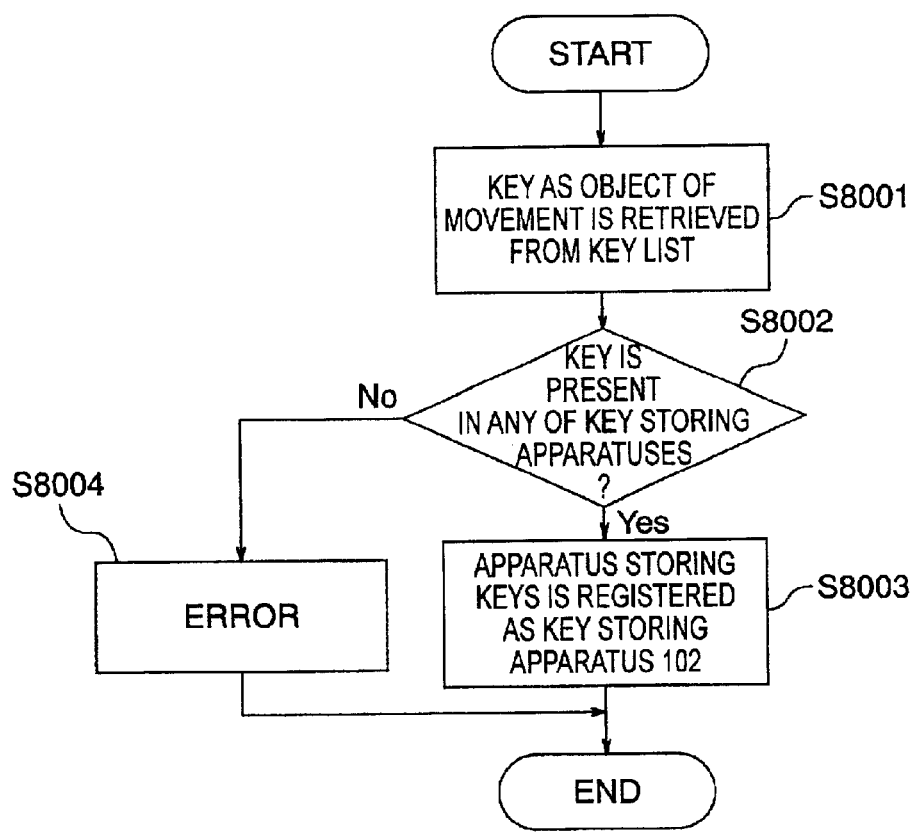
FIG. 14 is a flow chart useful in explaining the operation of determining the apparatus in the licence key movement operation in the controller to which the present invention is applied.

FIG. 14 is a flow chart useful in explaining the procedure of determining the apparatus(es) which is(are) used when the licence key is moved between the key storing apparatuses 102. In the case where when two or more key storing apparatuses 102 are electrically connected to the licence network, the licence key is moved to the certain key storing apparatus 102, the controller 103 needs to retrieve the key storing apparatus 102 which is holding the licence key becoming an object of the movement.

The controller 103 retrieves, from the licence key list, the licence keys which are stored in the key storing apparatuses 102 the information of which is described in the key storing apparatus list (Step S8001). If the licence key becoming an object has been found out, then the controller 103 registers the key storing apparatus 102, in which the licence key becoming an object is stored, as the licence storing apparatus from which the licence key is to be moved (Step S8003). On the other hand, if the key storing apparatus 102 in which the licence key becoming an object is stored has not been found out, then the controller 103 processes this case an error (Step S8004).

Figure 15:
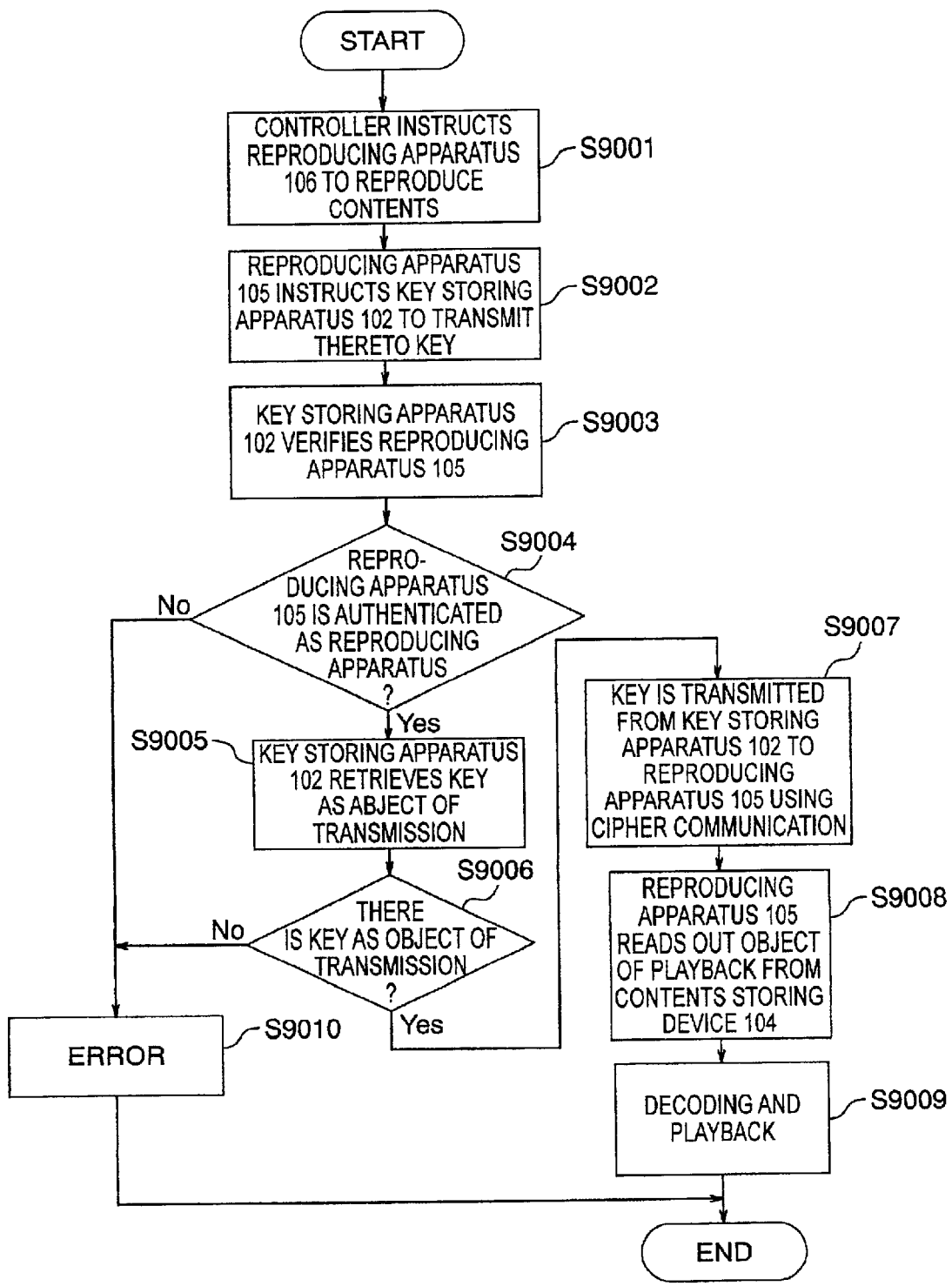
FIG. 15 is a flow chart useful in explaining the operation of reproducing the contents in a contents reproducing system to which the present invention is applied.

FIG. 15 is a flow chart useful in explaining the processing which is executed when reproducing the contents. When reproducing the contents, the contents reproducing apparatus 105 which is used in the playback of the contents, the key storing apparatus 102 in which the key is stored, and the contents storing device 104 in which the encrypted contents data is stored need to be specified, respectively. By the way, the processing of specifying the apparatuses, as illustrated in FIG. 13, is previously executed.

The playback processing starts to be executed when an instruction to reproduce the contents is issued from a user and so forth.

The controller 103 issues an instruction to reproduce the contents to the contents reproducing apparatus 105 (Step S9001). The contents reproducing apparatus 105 which has received the instruction issued thereto requests the key storing apparatus 102 in which the licence keys are stored to transmit thereto the licence key of interest (Step S9002). The key storing apparatus 102 which has received the request made thereto authenticates whether or not the contents reproducing apparatus 105 from which the request has been made is proper (Step S9003). If the contents reproducing apparatus 105 from which the request has been made is properly authenticated, then the key storing apparatus 102 retrieves the licence keys stored therein to confirm whether or not the licence key as an object is present (Step S9005). If it is confirmed that the key storing apparatus 102 has the licence key as an object, then the key storing apparatus 102 transmits the licence key becoming an object to the contents reproducing apparatus 105 by utilizing the cipher communication (Step S9007). The contents reproducing apparatus 105 which has received the licence key transmitted thereto, after having read out the contents data becoming an object of the decoding from the contents storing device 104 (Step S9008), decodes and reproduces the contents data thus read out (Step S9009). On the other hand, if it is confirmed in Step S9005 that the licence key as an object has not been found out, then since the playback of the contents is impossible, this case is processed as an error (Step S9010).

Figure 16:
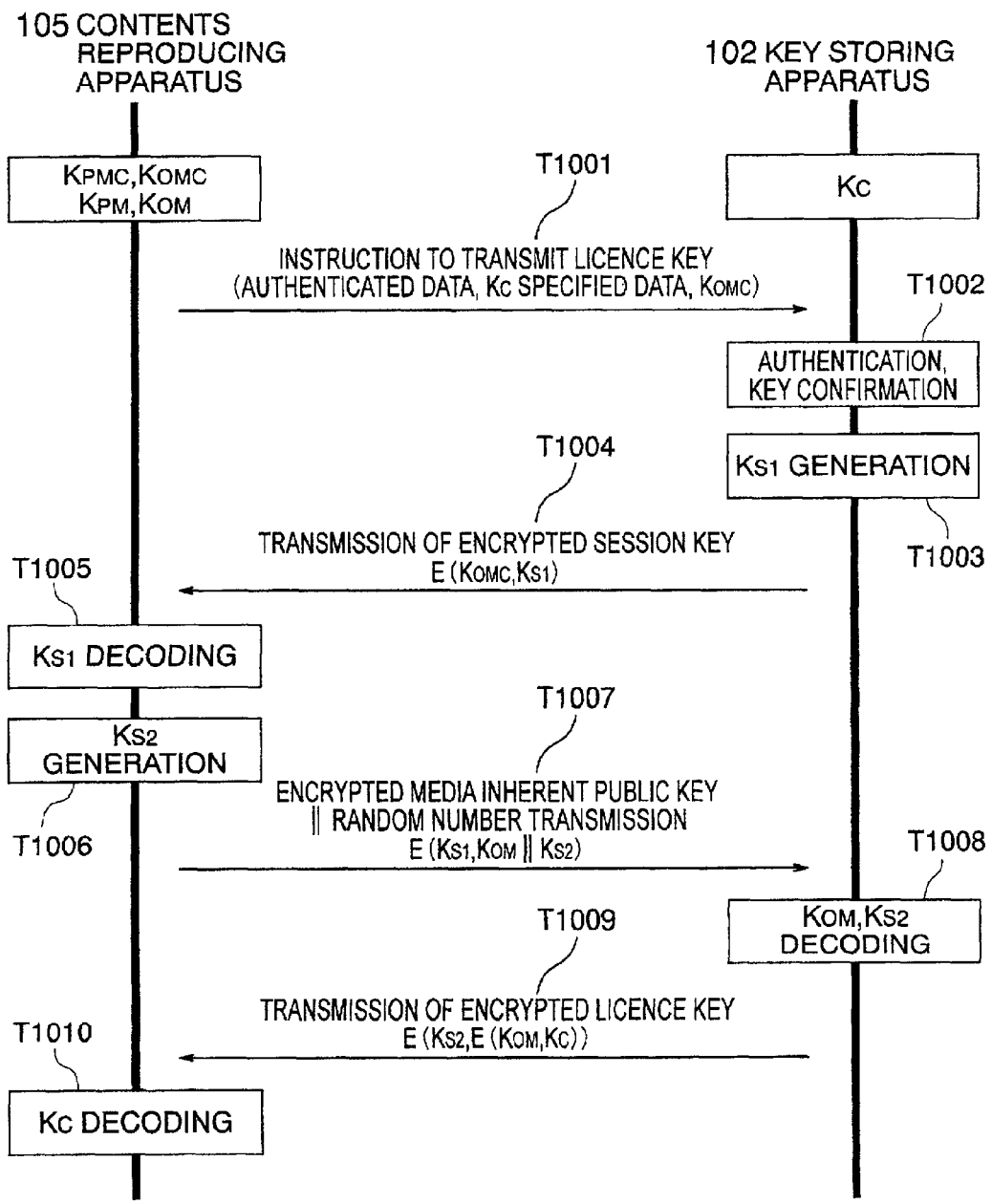
FIG. 16 is a sequence diagram useful in explaining an example of exchanging data between the contents reproducing apparatus and the key storing apparatus in FIG. 15.

FIG. 16 is a flow chart useful in explaining the procedure of the communication which is established between the key storing apparatus 102 and the contents reproducing apparatus 105 when reproducing the contents.

The encryption deciding circuit 402 in the contents reproducing apparatus 105 generates a licence key transmission instruction containing the authentication data of the contents reproducing apparatus 105 itself, the identification information of the encrypted contents data as an object of the playback, and the media-class public key KOMC paired with the media-class secret key KPMC, which is previously held, to transmit this instruction to the key storing apparatus 102 (Step T1001).

The CPU 305 of the key storing apparatus 102 which has received the instruction issued thereto carries out the authentication of the contents reproducing apparatus 105 and confirms that the requested licence key is stored in the nonvolatile memory 307 (Step T1002). The CPU 305 which has carried out the confirmation generates a session key KS1 (Step T1003), and encrypts this session key KS1 using the media-class public key KOMC which is contained in the licence key transmission instruction to transmit the encrypted session key KS1 to the contents reproducing apparatus 105 from which the instruction has been transmitted thereto (Step T1004).

The encryption decoding circuit 402 of the contents reproducing apparatus 105 which has received the encrypted session key KS1 decodes the encrypted session key KS1 using the media-class secret key KPMC, which is previously held therein, to obtain the session key KS1 (Step T1005). Thereafter, the encryption decoding circuit 402 generates a session key KS2 (Step T1006) and encrypts the session key, and the media inherent public key KOM provided with the media inherent secret key KPM, which is previously held therein, using the session key KS1 to transmit the encrypted session key KS2 and the like to the key storing apparatus 102 (Step T1007).

The CPU 305 in the key storing apparatus 102 which has received the encrypted session key KS2 and the like decodes the session key KS2 and the media inherent public key KOM, which have been encrypted, using the session key KS1 to obtain the session key KS2 and the media inherent public key KOM (Step T1008). Then, the CPU 305 encrypts the licence key KC, for which the transmission is required, using the media inherent public key KOMC and further encrypts the encrypted licence key KC using the session key KS2 to transmit the encrypted licence key KC to the contents reproducing apparatus 105 from which the instruction to transmit the licence key has been transmitted thereto (Step T1009).

The encryption decoding circuit 402 in the contents reproducing apparatus 105 which has received the encrypted licence key KC encodes the encrypted licence key KC using both of the session key KS2 and the media inherent secret key KPM to obtain the licence key KC (Step T1010).

FIG. 17 is a flow chart useful in explaining the processing of moving the licence key. Also, this figure shows the procedure when moving the key between two key storing apparatuses 102. The processing starts to be executed when an instruction to move the licence key is issued from a user and so forth.

In this processing, the key storing apparatus 102 which is holding the licence key becoming an object of the movement (hereinafter, referred to as "the key storing apparatus 102' as the source of the key movement" for short, when applicable) is previously specified by the procedure of Steps S7004 to S7006 shown in FIG. 13.

The controller 103 issues an instruction to move the licence key to the key storing apparatus 102 to which the licence key is to be moved (hereinafter, referred to as "the key storing apparatus 102 as the destination of the key movement" for short, when applicable) (Step SA001). The key storing apparatus 102 as the destination of the key movement which has received the instruction requests the key storing apparatus 102' as the source of the key movement, in which the licence key of interest is being stored, to transmit the licence key of interest (Step SA002). The key storing apparatus 102' as the source of the key movement which has received the request to transmit the licence key authenticates whether or not the key storing apparatus 102 as the destination of the key movement from which the request has been made is proper (Step SA003). If it is authenticated that the key storing apparatus 102 as the destination of the key movement from which the request has been made is proper, then the licence keys stored therein are retrieved to confirm whether or not the licence key as an object is present therein (Step SA005). If it is confirmed that the licence key as an object is present therein, then the key storing apparatus 102' as the source of the key movement, by utilizing the cipher communication, transmits the licence key becoming an object of the movement to the key storing apparatus 102 as the destination of the key movement 102 (Step SA007). Then, the key storing apparatus 102' as the source of the key movement deletes the information of the licence key thus transmitted thereto from the nonvolatile memory 307 (Step SA008). The key storing apparatus 102 as the destination of the key movement which has received the licence key transmitted thereto stores the licence key thus received in the nonvolatile memory 307 (Step SA009). On the other hand, if it is confirmed in Step SA005 that the licence key becoming an object has not been found out, then since the playback can not be carried out, this case is processed as an error.

FIG. 18 is a flow chart useful in explaining the procedure of the communication established between the key storing apparatus 102' as the source of the key movement and the key storing apparatus 102 as the destination of the key movement when the licence key is moved between two key storing apparatuses 102.

The CPU 305 of the key storing apparatus 102 as the destination of the key movement generates an instruction to transmit the licence key containing the authentication data of the key storing apparatus 102 as the destination of the key movement itself, the identification information of the contents data, as an object of the playback, which has been encrypted, and the media-class public key K'OMC paired with the media-class secret key K'PMC, which is previously held therein, to transmit that instruction thus generated to the key storing apparatus 102' as the source of the key movement (Step T2001).

The CPU 305 of the key storing apparatus 102' as the source of the key movement which has received the instruction to transmit the licence key carries out the authentication of the key storing apparatus 102 as the destination of the key movement, and confirms that the licence key for which the request has been made is stored in the nonvolatile memory 307 (Step T2002). Then, the CPU 305 which has carried out the confirmation generates a session key K'S1 (Step T2003) and encrypts the session key K'S1 thus generated using the media-class public key K'OMC contained in the instruction to transmit the licence key to transmit the encrypted session key to the key storing apparatus 102 as the destination of the key movement from which the instruction of interest has been issued (Step T2004).

The CPU 305 of the key storing apparatus 102 as the destination of the key movement which has received the encrypted session key KS1 decodes the encrypted session key K'S1 using the media-class secret key K'PMC, which is previously held therein, to obtain the session key K'S1 (Step T2005). Thereafter, the CPU 305 of the key storing apparatus 102 as the destination of the key movement generates a session key K'S2 (Step T2006), and encrypts both of the session key K'S2 thus generated and the media inherent public key K'OM paired with the media inherent secret key K'PM, which is previously held therein, using the session key K'S1 to transmit the encrypted media inherent public key and the like to the key storing apparatus 102' as the source of the key movement (Step T2007).

In response to the encrypted media inherent public key and the like transmitted thereto, the CPU 305 of the key storing apparatus 102' as the source of the key movement decodes both of the session key K'S2 and the media inherent public key K'OM, which have been obtained by the encryption, using the session key K'S1 to obtain the session key K'S2 and the media inherent public key K'OM (Step T2008). Then, the CPU 305 of the key storing apparatus 102' as the source of the key movement encrypts the licence key K'C., for which the request has been made, using the media inherent public key K'OMC and further encrypts the licence key K'C. thus encrypted using the session key K'2 to transmit the encrypted licence key to the key storing apparatus 102 as the destination of the key movement from which the instruction to transmit the licence key has been issued (Step T2009).

In response to the encrypted licence key, the CPU 305 of the key storing apparatus 192 as the destination of the key movement decodes the encrypted licence key K'C. using both of the session key K'S2 and the media inherent secret key K'PM to obtain the licence key K'C. (Step T2010).

As set forth hereinabove, according to the present invention, in the system requiring the protection of the copyright such as the system for the contents distribute transmission service, it is possible to provide readily the copyright protection function for the existing information processing system with no copyright protection function without adding the large change such as the exchange of the storage device. In addition, a user can manage the contents and the licence key without being conscious of the complicacy of the data structure due to the fact that the system includes the copyright protection function.

While the present invention has been particularly shown and described with reference to the preferred embodiments and the specified modifications thereof, it will be understood that the various changes and other modifications will occur to those skilled in the art without departing from the scope and true spirit of the invention. The scope of the invention is therefore to be determined solely by the appended claims.

What is claimed is:

1. A hub system to which at least one storage device and at least one contents reproducing apparatus can be electrically connected, said hub system comprising:
   a hub apparatus to which said at least one storage device and said at least one contents reproducing apparatus can be electrically connected; and
   a key storing apparatus, electrically connected to said hub apparatus, for storing therein keys, each being used to decode encrypted contents data,
   wherein said key storing apparatus comprises:
   store means for storing said keys,
   authentication means for authenticating said at least one contents reproducing apparatus and said at least one storage device which are electrically connected thereto,
   means for transmitting a key in said store means to said at least one contents reproducing apparatus as a partner of communication by utilizing cipher communication if said at least one contents reproducing apparatus to which the key is transmitted is authenticated as the partner of communication by said authentication means, and means for reading out a key from said store means, transmitting the key thus read to a storage device as a partner of communication by utilizing cipher communication, and deleting from said store means the key thus read, if said storage device to which the key thus read is transmitted is authenticated as the partner of communication by said authentication means.

2. A hub system according to claim 1, wherein said key storing apparatus is removably attached to said hub apparatus.

3. A controller which is electrically connected to a hub system comprising:

acquirement means for acquiring information from various kinds of apparatuses and devices which are electrically connected to said hub system;

selection means, electrically connected to said acquirement means, for selecting a contents reproducing apparatus to be used to reproduce contents from among said various kinds of apparatuses and devices which are electrically connected to said hub system by utilizing the information acquired by said acquirement means;

means, electrically connected to said acquirement means, for retrieving contents data from a contents storing device in which encrypted contents data of the contents to be reproduced is stored by utilizing the information acquired by said equipment means, said contents storing device being among said various kinds of apparatuses and devices which are electrically connected to said hub apparatus;

means, electrically connected to said acquirement means, for retrieving a key from a key storing apparatus by utilizing the information acquired by said acquirement means, said key being used to decode said contents data, said key storing apparatus being among said various kinds of apparatuses and devices which are electrically connected to said hub apparatus; and means for transmitting an instruction to reproduce said contents to be reproduced to said contents reproducing apparatus which is selected by said selection means.

4. A controller according to claim 3, further comprising:

means for transmitting an instruction to move said key which is used to decode, to said key storing apparatus, in which said key being used to decode said contents data, is stored.

5. A hub system according to claim 2, further comprising:

acquirement means for acquiring information from various kinds of apparatuses and devices which are electrically connected to said hub system;

selection means, electrically connected to said acquirement means, for selecting a contents reproducing apparatus to be used to reproduce contents from among said various kinds of apparatuses and devices which are electrically connected to said hub system by utilizing the information acquired by said acquirement means;

means, electrically connected to said acquirement means, for retrieving contents data from a contents storing device in which encrypted contents data of the contents to be reproduced is stored by utilizing the information acquired by said equipment means, said contents storing device being among said various kinds of apparatuses and devices which are electrically connected to said hub apparatus;

means, electrically connected to said acquirement means, for retrieving a key from a key storing apparatus by utilizing the information acquired by said acquirement means, said key being used to decode said contents data, said key storing apparatus being among said various kinds of apparatuses and devices which are electrically connected to said hub apparatus; and means for transmitting an instruction to reproduce said contents to be reproduced to said contents reproducing apparatus which is selected by said selection means.

6. A contents reproducing system which manages encrypted contents data and a key used to decode said encrypted contents data, said contents reproducing system comprising:

a hub apparatus;

a controller electrically connected to said hub apparatus;

a contents storing device which is electrically connected to said hub apparatus;

a contents reproducing apparatus which is electrically connected to said hub apparatus; and a key storing apparatus, electrically connected to said hub apparatus, for storing therein keys each being used to decode encrypted contents data, wherein said key storing apparatus comprises:

store means for storing said keys, authentication means for authenticating said contents reproducing apparatus and said contents storing device which are electrically connected thereto;

means for transmitting a key in said store means to said contents reproducing apparatus as a partner of communication by utilizing cipher communication, if said contents reproducing apparatus to which the key is transmitted is authenticated as the partner of communication by said authentication means, and means for reading out a key from said store means, transmitting the key thus read to said contents storing device as a partner of communication by utilizing cipher communication, and deleting from said store means the key thus read, if said contents storing device to which the key thus read is transmitted is authenticated as the partner of communication by said authentication means;

wherein said controller comprises:

acquirement means for acquiring information as to apparatus and device from various kinds of apparatuses and devices which are electrically connected to said hub apparatus, selection means electrically connected to said acquirement means, for selecting a contents reproducing apparatus to be used to reproduce contents, from among said various kinds of apparatuses and devices which are electrically connected to said hub apparatus, by utilizing the information as to apparatus and device acquired by said acquirement means;

means, electrically connected to said acquirement means, for retrieving a contents storing device in which encrypted contents data of contents to be reproduced is stored, from among said various kinds of apparatuses and devices which are electrically connected to said hub apparatus, by utilizing the information as to apparatus and device acquired by said acquirement means;

means, electrically connected to said acquirement means, for retrieving a key storing apparatus in which a key which is used to decode said contents data is stored, from among said various kinds of apparatuses and devices which are electrically connected to said hub apparatus, by utilizing the information as to the apparatus and device acquired by said acquirement means; and means for transmitting an instruction to reproduce said contents to be reproduced to said contents reproducing apparatus which is selected by said selection means.

7. A contents reproducing system according to claim 6, further comprising:

means for retrieving, from said contents reproducing system, encrypted contents data to be moved and a key for decoding the contents data to be moved, which are separately stored in discrete contents storing devices, respectively, to reproduce or move them thus retrieved, when the contents to be moved is specified.

* * * * *